US012666359B2

(12) United States Patent
Choi

(10) Patent No.: US 12,666,359 B2
(45) Date of Patent: Jun. 23, 2026

(54) ELECTRONIC DEVICE AND INTEGRATED CONTROL METHOD OF TIME-AVERAGED SPECIFIC ABSORPTION RATE AND TARGET WAKE TIME

(71) Applicant: SAMSUNG ELECTRONICS CO., LTD., Suwon-si (KR)

(72) Inventor: Junsu Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 346 days.

(21) Appl. No.: 18/312,926

(22) Filed: May 5, 2023

(65) Prior Publication Data

US 2024/0023018 A1 Jan. 18, 2024

Related U.S. Application Data

(63) Continuation of application No. PCT/KR2023/005054, filed on Apr. 14, 2023.

(30) Foreign Application Priority Data

Jul. 15, 2022 (KR) ........................ 10-2022-0087676
Oct. 5, 2022 (KR) ........................ 10-2022-0126931

(51) Int. Cl.
H04W 52/02 (2009.01)

(52) U.S. Cl.
CPC ... *H04W 52/0216* (2013.01); *H04W 52/0232* (2013.01)

(58) Field of Classification Search
None
See application file for complete search history.

(56) References Cited

U.S. PATENT DOCUMENTS 8,825,102 B2 9/2014 Chakraborty et al.
11,304,152 B2 4/2022 Krenz et al.
(Continued)

FOREIGN PATENT DOCUMENTS

KR 10-1783609 11/2017
KR 20190043916 A 4/2019
KR 20220015843 A 2/2022

OTHER PUBLICATIONS

Extended European Search Report dated May 19, 2025 issued in European Patent Application No. 23839755.8.
(Continued)

*Primary Examiner* — Walter J Divito

(74) *Attorney, Agent, or Firm* — Nixon & Vanderhye P.C.

(57) ABSTRACT

An electronic device according to an example embodiment includes: at least one wireless communication module comprising communication circuitry configured to transmit and receive a wireless signal, at least one processor operatively connected to the at least one wireless communication module, and a memory electrically connected to the processor and configured to store instructions executable by the processor, wherein, in response to the instructions being executed by the processor, the processor may be configured to: determine whether there is a target wake time (TWT) parameter for a TWT service, determine a time-averaged specific absorption rate (TAS) backoff regulation value for a time window based on the TWT parameter, and control the at least one wireless communication module to perform communication during the time window based on the TAS backoff regulation value and the TWT parameter.

20 Claims, 13 Drawing Sheets

(56) References Cited

U.S. PATENT DOCUMENTS

| | | |
|---|---|---|
| 2012/0270592 A1 | 10/2012 | Ngai et al. |
| 2021/0176712 A1 | 6/2021 | Sun et al. |
| 2021/0250855 A1 | 8/2021 | Tang |
| 2021/0314876 A1 | 10/2021 | Zhao et al. |
| 2025/0063509 A1* | 2/2025 | Bang .................... H04W 52/02 |
| 2025/0106788 A1* | 3/2025 | Nadakuduti ......... H04B 7/0608 |

OTHER PUBLICATIONS

Search Report and Written Opinion dated Jul. 3, 2023 issued in International Patent Application No. PCT/KR2023/005054.
Santi et al. "Accurate Energy Modeling and Characterization of IEEE 802.11ah RAW and TWT", Jun. 8, 2019, 28 pages.

* cited by examiner

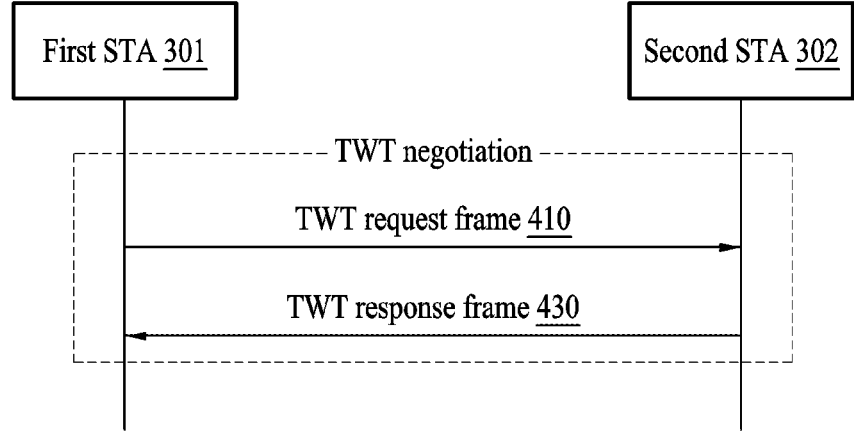
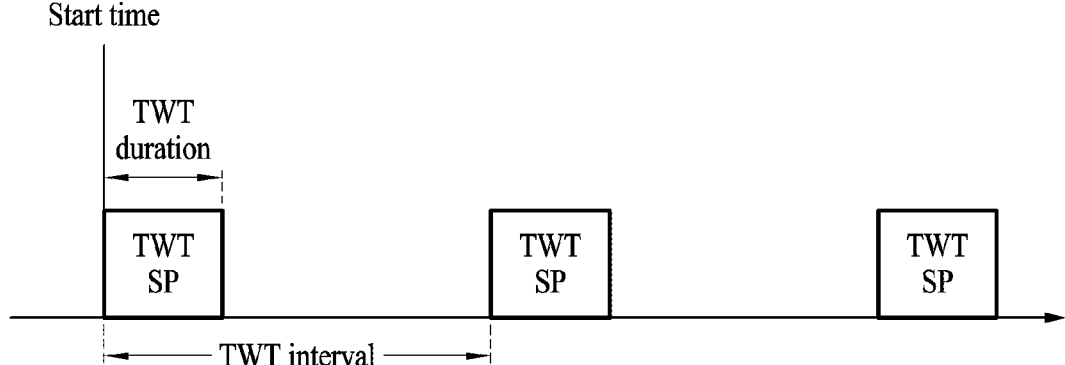
FIG. 4

510

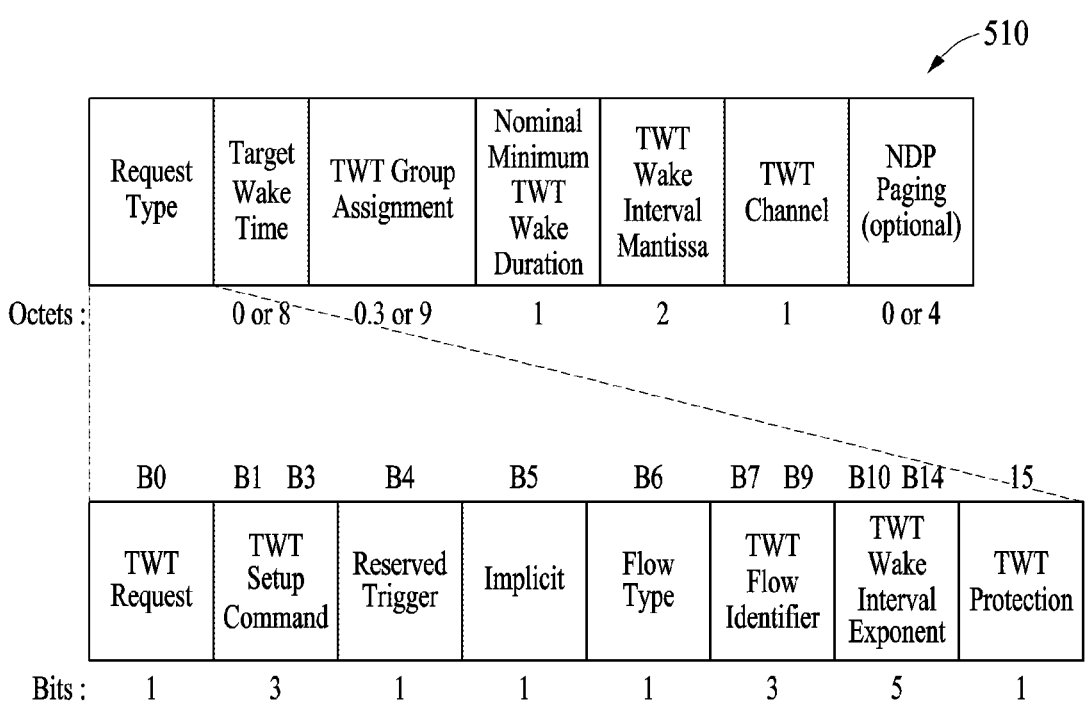

| Request Type | Target Wake Time | TWT Group Assignment | Nominal Minimum TWT Wake Duration | TWT Wake Interval Mantissa | TWT Channel | NDP Paging (optional) |
|---|---|---|---|---|---|---|
| Octets : | 0 or 8 | 0.3 or 9 | 1 | 2 | 1 | 0 or 4 |

| | B0 | B1 B3 | B4 | B5 | B6 | B7 B9 | B10 B14 | 15 |
|---|---|---|---|---|---|---|---|---|
| | TWT Request | TWT Setup Command | Reserved Trigger | Implicit | Flow Type | TWT Flow Identifier | TWT Wake Interval Exponent | TWT Protection |
| Bits : | 1 | 3 | 1 | 1 | 1 | 3 | 5 | 1 |

530

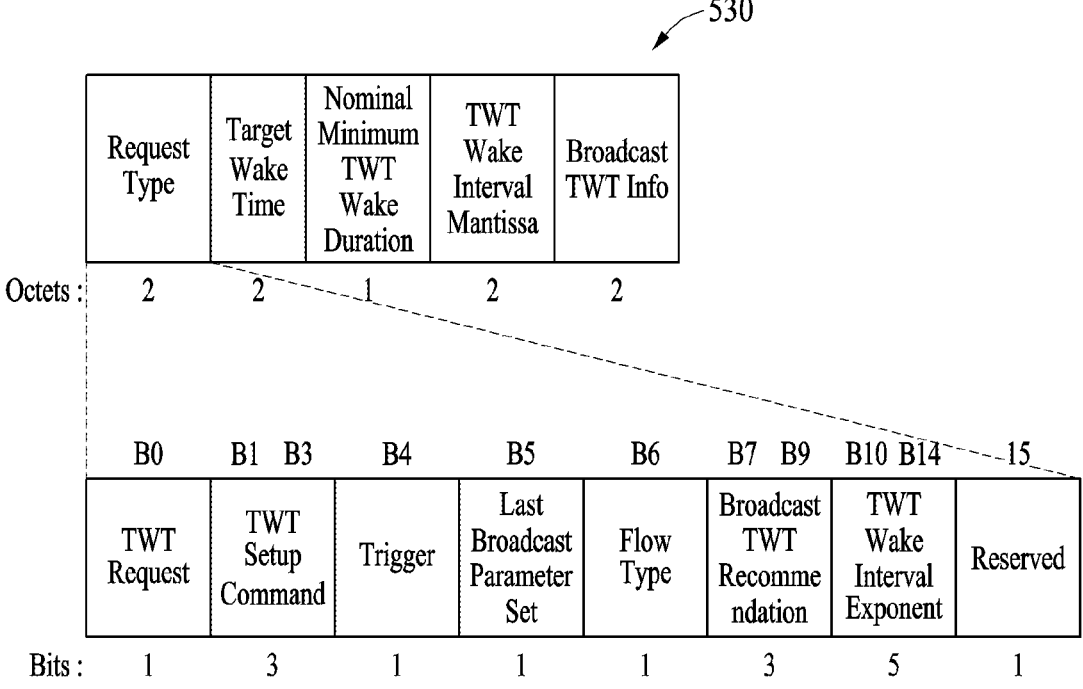

| Request Type | Target Wake Time | Nominal Minimum TWT Wake Duration | TWT Wake Interval Mantissa | Broadcast TWT Info |
|---|---|---|---|---|
| Octets : | 2 | 2 | 1 | 2 | 2 |

| | B0 | B1 B3 | B4 | B5 | B6 | B7 B9 | B10 B14 | 15 |
|---|---|---|---|---|---|---|---|---|
| | TWT Request | TWT Setup Command | Trigger | Last Broadcast Parameter Set | Flow Type | Broadcast TWT Recommendation | TWT Wake Interval Exponent | Reserved |
| Bits : | 1 | 3 | 1 | 1 | 1 | 3 | 5 | 1 |

FIG. 5

<Mode 1>
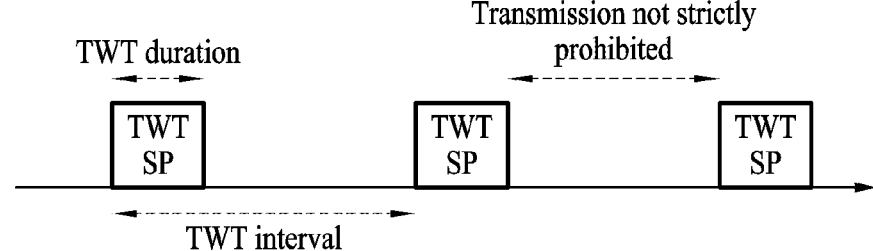
<Mode 2>
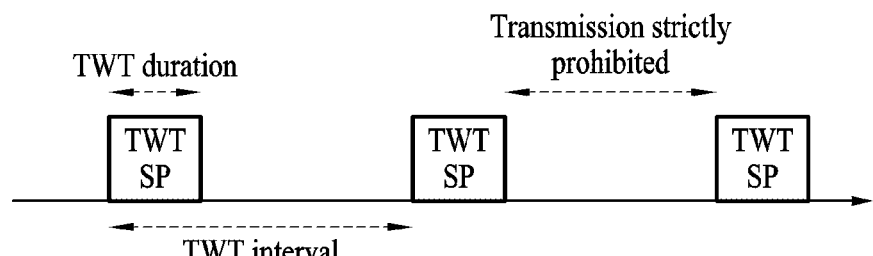
FIG. 11

ELECTRONIC DEVICE AND INTEGRATED CONTROL METHOD OF TIME-AVERAGED SPECIFIC ABSORPTION RATE AND TARGET WAKE TIME

CROSS-REFERENCE TO RELATED APPLICATIONS

This application is a continuation of International Application No. PCT/KR2023/005054 designating the United States, filed on Apr. 14, 2023, in the Korean Intellectual Property Receiving Office and claiming priority to Korean Patent Application No. 10-2022-0087676 filed on Jul. 15, 2022, in the Korean Intellectual Property Office, and to Korean Patent Application No. 10-2022-0126931 filed on Oct. 5, 2022, in the Korean Intellectual Property Office, the disclosures of all of which are incorporated by reference herein in their entireties.

BACKGROUND

1. Field

The disclosure relates to an electronic device and an integrated control method for a time-averaged specific absorption rate (TAS) and a target wake time (TWT).

2. Description of Related Art

The advent of electronic devices such as smartphones, tablet personal computers (PCs), or laptops has brought an explosive demand for high-speed wireless connection. Boosted by this trend and the increasing demand for high-speed wireless connection, the Institute of Electrical and Electronic Engineers (IEEE) 802.11 standard for wireless communications has been firmly established as a representative and universal high-speed wireless communication standard in the information technology (IT) industry. Early wireless local area network (WLAN) technology developed around 1997 could support a maximum transmission rate of 1 to 2 megabits per second (Mbps). Since then, WLAN technology has been steadily developed based on the demand for faster wireless connection, and new WLAN technologies that improve a transmission rate (or speed), such as IEEE 802.11n, 802.11ac, or 802.11ax, have been steadily developed. According to IEEE 802.11ax, which is currently the latest standard, a maximum transmission rate reaches several gigabits per second (Gbps).

Currently, WLAN covers various public areas such as offices, airports, stadiums, or stations, in addition to private areas such as homes, and provides users with high-speed wireless connections throughout society. Accordingly, WLAN has had a significant impact on people's lifestyles and culture and has now become a norm in modern lives.

SUMMARY

According to an example embodiment, there is provided an electronic device including: at least one wireless communication module comprising communication circuitry configured to transmit and receive a wireless signal; at least one processor operatively connected to the wireless communication module; and a memory electrically connected to the processor and configured to store instructions executable by the processor. In response to the instructions being executed by the processor, the processor may be configured to: determine whether there is a target wake time (TWT)

parameter for a TWT service; determine a time-averaged specific absorption rate (SAR) (TAS) backoff regulation value for a time window based on the TWT parameter; and control the wireless communication module to perform communication during the time window based on the TAS backoff regulation value and the TWT parameter.

According to an example embodiment, there is provided an electronic device including: at least one wireless communication module comprising communication circuitry configured to transmit and receive a wireless signal; at least one processor operatively connected to the wireless communication module; and a memory electrically connected to the processor and configured to store instructions executable by the processor. In response to the instructions being executed by the processor, the processor may be configured to: determine whether there is a TWT parameter for a TWT service; and control the wireless communication module to perform communication during a time window based on a TAS backoff regulation value for the time window and the TWT parameter. The TWT parameter may include at least one of start time information of a TWT service period, TWT duration information of the TWT service period, or TWT interval information of the TWT service period.

According to an example embodiment, there is provided an electronic device including: at least one wireless communication module comprising communication circuitry configured to transmit and receive a wireless signal; at least one processor operatively connected to the wireless communication module; and a memory electrically connected to the processor and configured to store instructions executable by the processor. In response to the instructions being executed by the processor, the processor may be configured to: determine whether there is a TWT parameter for a TWT service; set transmission power to be used during a time window based on the TWT parameter; and control the wireless communication module to perform communication by the transmission power during the time window based on the TWT parameter.

Other features and aspects will be apparent from the following detailed description, the drawings, and the claims.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIG. 4 is a diagram illustrating an example target wake time (TWT) protocol for traffic transmission according to an embodiment;

FIG. 5 is a diagram illustrating a TWT element used in a protocol for traffic transmission according to an embodiment;

FIG. 11 is a diagram illustrating a mode in which communication is possible even outside a TWT service period (SP) according to an embodiment;

DETAILED DESCRIPTION

Figures 1, 2:
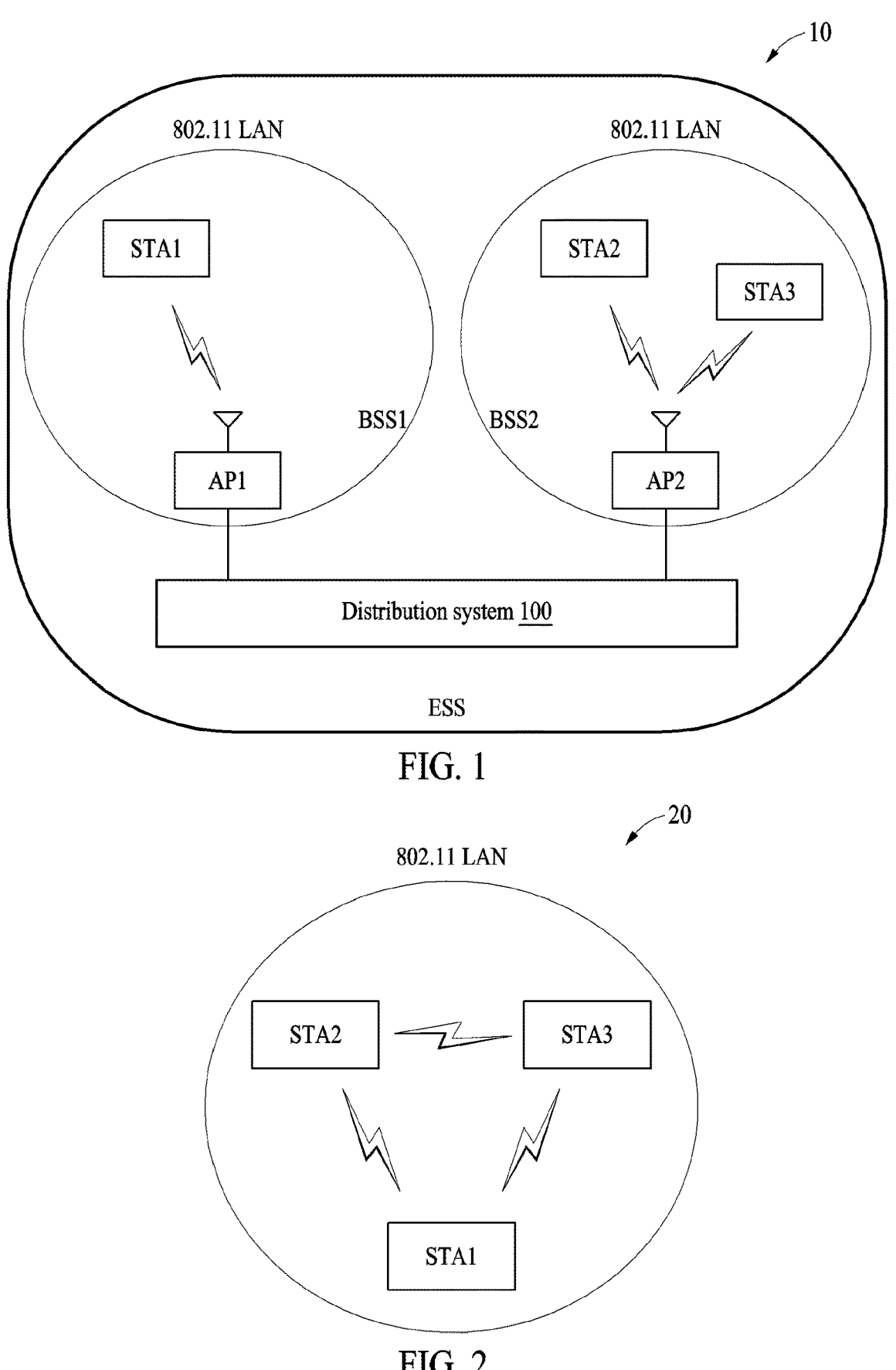
FIG. 1 is a diagram illustrating an example configuration of a wireless local area network (WLAN) system according to an embodiment.
FIG. 2 is a diagram illustrating an example configuration of a WLAN system according to an embodiment.

Hereinafter, various example embodiments will be described in greater detail with reference to the accompanying drawings. When describing the embodiments with reference to the accompanying drawings, like reference numerals refer to like elements and a repeated description related thereto may not be provided.

FIG. 1 is a diagram illustrating an example wireless local area network (WLAN) system according to an embodiment.

Referring to FIG. 1, according to an example embodiment, a WLAN system 10 may represent an infrastructure mode in which an access point (AP) is present in a WLAN structure conforming to the Institute of Electrical and Electronic Engineers (IEEE) 802.11 standard. The WLAN system 10 may include at least one basic service set (BSS), for example, BSS1 and BSS2. The BSS (e.g., BSS1 or BSS2) may be a set of an AP and a station (STA), for example, an electronic device 1101, 1102, or 1104 of FIG. 11, that may synchronize with each other to communicate with each other. BSS1 may include AP1 and STA1, and BSS2 may include AP2, STA2, and STA3.

According to an example embodiment, the WLAN system 10 may include one or more STAs (e.g., STA1 to STA3), a plurality of APs (e.g., AP1 and AP2) that provides a distribution service, and a distribution system 100 that connects the plurality of APs (e.g., AP1 and AP2). The distribution system 100 may implement an extended service set (ESS) by connecting a plurality of BSSs (e.g., BSS 1 and BSS 2). The ESS may be used as a term indicating one network in which a plurality of APs (e.g., AP1 and AP2) is connected via the distribution system 100. The plurality of APs (e.g., AP1 and AP2) included in one ESS may have the same service set identifier (SSID).

According to an example embodiment, the STAs (e.g., STA1 to STA3) may each be an arbitrary functional medium including a medium access control (MAC) and a wireless-medium physical layer (PHY) interface that conform to the IEEE 802.11 standard. The term "STA" may be used to include both an AP STA and a non-AP STA. The STA may also be referred to as various terms, such as, for example, an electronic device, a mobile terminal, a wireless device, a wireless transmit/receive unit (WTRU), a user equipment (UE), a mobile station (MS), and a mobile subscriber unit (MSU), or may be simply referred to as a user.

FIG. 2 is a diagram illustrating an example WLAN system according to an embodiment.

Referring to FIG. 2, according to an example embodiment, a WLAN system 20 may represent an ad-hoc mode in which a network is established between a plurality of STAs (e.g., STA1 to STA3) without an AP in a WLAN structure of the IEEE 802.11 standard and communication is performed, unlike the WLAN system 10 of FIG. 1. The WLAN system 20 may include a BSS operating in the ad-hoc mode, e.g., an independent BSS (IBSS).

According to an example embodiment, the IBSS does not include an AP, and thus there may be no centralized management entity that performs a management function. In the IBSS, STAs may be managed in a distributed manner. In the IBSS, all the STAs may be mobile STAs, and may establish a self-contained network because an access to a distribution system is not allowed.

Figure 3:
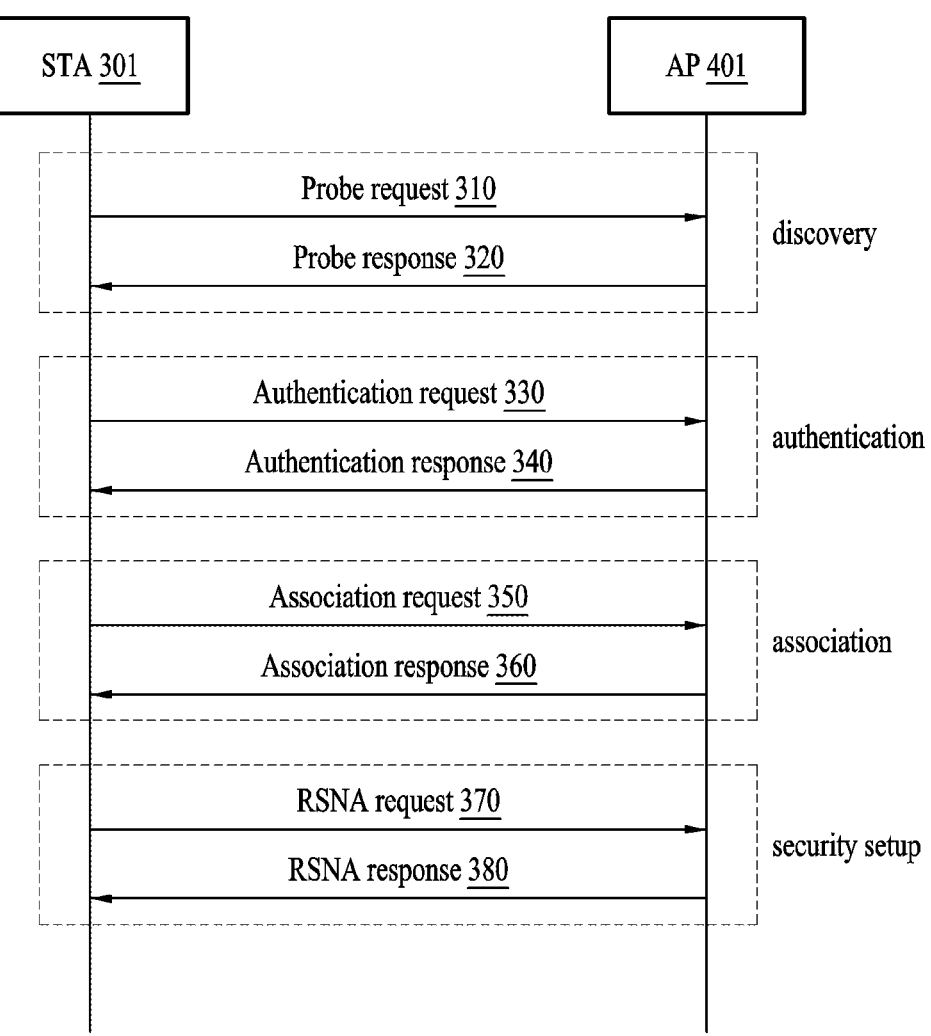
FIG. 3 is a signal flow diagram illustrating an example link setup operation according to an embodiment.

FIG. 3 is a signal flow diagram illustrating an example link setup operation according to an embodiment.

Referring to FIG. 3, according to an example embodiment, a link setup operation may be performed between devices (e.g., an STA 301 and an AP 401) to communicate with each other. For link setup, a network may be discovered, authentication may be performed, association may be established, and a setup operation for security may be performed. The link setup operation may also be referred to as a session initiation operation or a session setup operation. Also, the discovery, authentication, association, and security setup operations of the link setup operation may be collectively referred to as an association operation.

According to an example embodiment, the network discovery operation may include operations 310 and 320. In operation 310, the STA 301 (e.g., an electronic device 1401, 1402, or 1404 of FIG. 14) may transmit a probe request frame to probe which AP is present and may then wait for a response to the probe request frame. The STA 301 may perform a scanning operation to access a network to discover a network that is to participate in. The probe request frame may include information of the STA 301 (e.g., a device name and/or address of the STA 301). The scanning operation in operation 310 may be an active scanning operation. In operation 320, the AP 401 may transmit, to the STA 301 transmitting the probe request frame, a probe response frame in response to the probe request frame. The probe response frame may include information of the AP 401 (e.g., a device name and/or network information of the AP 401). Although the network discovery operation is illustrated as being performed through active scanning in FIG. 3, examples of which are not necessarily limited thereto, and when the STA 301 performs passive scanning, the operation of transmitting the probe request frame may be omitted. The STA 301 performing passive scanning may receive a beacon frame transmitted by the AP 401 and perform the following subsequent operations.

According to an example embodiment, after the STA 301 discovers the network, the authentication operation including operations 330 and 340 may be performed. In operation 330, the STA 301 may transmit an authentication request frame to the AP 401. In operation 340, the AP 401 may determine whether to allow authentication for the STA 301 based on information included in the authentication request frame. The AP 401 may provide the STA 301 with a result of processing the authentication through an authentication response frame. An authentication frame used for authentication request/response may correspond to a management frame.

According to an example embodiment, the authentication frame may include information on an authentication algorithm number, an authentication transaction sequence number, a status code, a challenge text, a robust security network (RSN), or a finite cyclic group.

According to an example embodiment, after the STA 301 is successfully authenticated, the association operation including operations 350 and 360 may be performed. In operation 350, the STA 301 may transmit an association request frame to the AP 401. In operation 360, the AP 401 may transmit an association response frame to the STA 301 in response to the association request frame.

According to an example embodiment, the association request frame and/or the association response frame may include information relating to various capabilities. For example, the association request frame may include information relating to various capabilities, such as, for example, a beacon listen interval, an SSID, a supported rate, a supported channel, an RSN, a mobility domain, a supported operating class, a traffic indication map (TIM) broadcast request, and/or an interworking service capability. For example, the association response frame may include information relating to various capabilities, such as, for example, a status code, an association ID (AID), a supported rate, an enhanced distributed channel access (EDCA) parameter set, a received channel power indicator (RCPI), a received signal to noise indicator (RSNI), a mobility domain, a timeout interval (e.g., an association comeback time), a overlapping BSS scan parameter, a TIM broadcast response, and/or a quality of service (QoS) map.

According to an example embodiment, after the STA 301 is successfully associated with the network, the security setup operation including operations 370 and 380 may be performed. The security setup operation may be performed through a robust security network association (RSNA) request/response. For example, the security setup operation may include a private key setup operation performed through four-way handshaking using an extensible authentication protocol over LAN (EAPOL) frame. The security setup operation may be performed using another security scheme that is not defined in the IEEE 802.11 standard.

According to an example embodiment, a security session may be set between the STA 301 and the AP 401 by the security setup operation, and the STA 301 and the AP 401 may perform secure data communication.

FIG. 4 is a diagram illustrating a target wake time (TWT) protocol for traffic transmission according to an embodiment.

Figure 14:
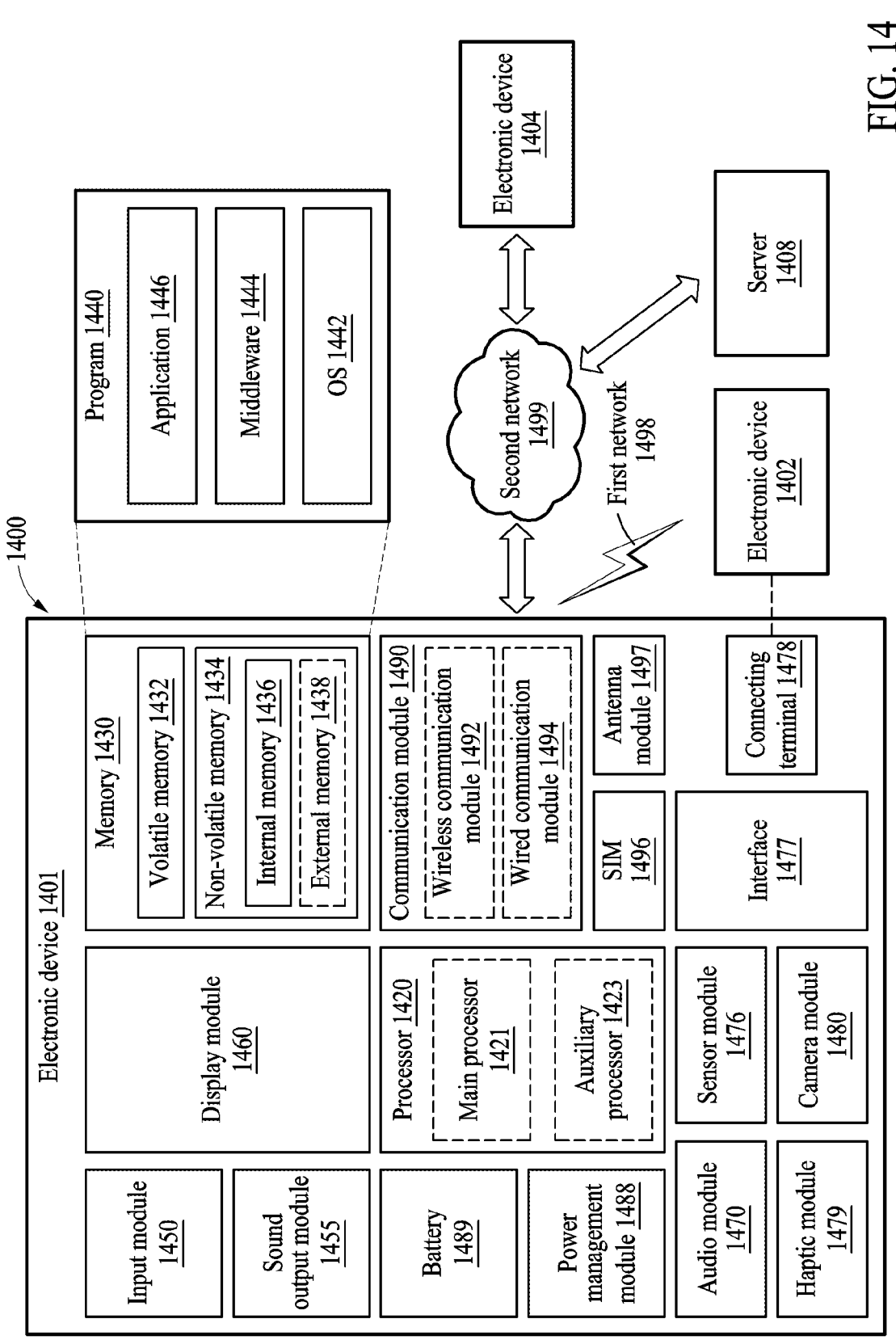
FIG. 14 is a block diagram illustrating an example electronic device in a network environment according to an embodiment.

Referring to FIG. 4, according to an example embodiment, in a wireless communication system (e.g., the wireless communication system 10 of FIG. 1 or the wireless communication system 20 of FIG. 2), a first STA 301 (e.g., the electronic device 1401 of FIG. 14) and/or a second STA 302 (e.g., an AP, or the electronic device 1402 or the electronic device 1404 of FIG. 14) may perform wireless communication according to a TWT protocol within a BSS. A TWT may be a time resource that is set to manage activities of an STA (e.g., the first STA 301 or the second STA 302) in the BSS and may be defined to minimize and/or reduce an operation in a wake state (or an awake state) (e.g., a wake mode) of the STA (e.g., the first STA 301 or the second STA 302). TWT setup may be for an STA (e.g., the first STA 301 or the second STA 302) to transmit and receive data for a predetermined TWT duration at each predetermined TWT interval, and a plurality of STAs (e.g., the first STA 301 and the second STA 302) may operate at a set time according to the TWT setup.

According to an example embodiment, the first STA 301 may perform wireless communication with the second STA 302 that is an external electronic device according to the TWT protocol. The first STA 301 and the second STA 302 may perform a TWT negotiation to transmit and receive data to each other according to the TWT protocol. The TWT negotiation between the first STA 301 and the second STA 302 may be performed as the first STA 301 transmits a TWT request frame 410 for requesting the TWT setup to the second STA 302 and the second STA 302 transmits a TWT response frame 430 for responding to the TWT setup to the first STA 301 in response to the TWT request frame 410. The first STA 301 requesting TWT may also be referred to as a TWT requesting STA, and the second STA 302 communicating with the TWT requesting STA based on the TWT request may also be referred to as a TWT responding STA. For example, the TWT requesting STA may be a first user STA, and the TWT responding STA may be an AP or a second user STA.

According to an example embodiment, the TWT request frame 410 and/or the TWT response frame 430 may include a TWT element (e.g., a TWT element 510 or 530 of FIG. 5) for setting a TWT parameter (or TWT parameter information). The TWT element included in the TWT request frame 410 may also be referred to as a TWT request element, and the TWT element included in the TWT response frame 430 may also be referred to as a TWT response element. The TWT request element and the TWT response element may be of the same format or of different formats of which some of fields are different.

According to an example embodiment, the first STA 301 and the second STA 302 may perform wireless communication according to the TWT setup through the TWT negotiation, for example, the TWT parameter. The TWT parameter may be an operating parameter (e.g., a periodic parameter and/or an aperiodic parameter) for communication between the first STA 301 and the second STA 302 based on the TWT protocol. The TWT parameter may include, for example, start time information of a TWT service period (or TWT SP), duration information of the TWT service period, and/or TWT interval information of the TWT service period.

According to an example embodiment, the first STA 301 may periodically switch the wake state (or the awake state) (e.g., the wake mode) and a doze/sleep state (e.g., a doze mode) based on the TWT parameter. For example, a wireless communication module of the first STA 301 for performing communication with the second STA 302 may be periodically switched to the wake state and the doze state based on the TWT parameter.

According to an example embodiment, the first STA 301 may be switched from the doze state to the wake state during the TWT service period to transmit and receive data, and from the wake state to the doze state during a period other than the TWT service period. For example, the doze state may be a state in which data transmission and reception by an STA (e.g., the first STA 301) is not performed for power saving, and the wake state may be a state in which data transmission and reception by an STA (e.g., the first STA 301) is performed.

FIG. 5 is a diagram illustrating an example TWT element used in a protocol for traffic transmission according to an embodiment.

Referring to FIG. 5, according to an example embodiment, a TWT request frame (e.g., the TWT request frame 410 of FIG. 4) and/or a TWT response frame (e.g., the TWT response frame 430 of FIG. 4) may include a TWT element (e.g., a TWT element 510 or 530) for setting a TWT parameter (or TWT parameter information). The TWT element 510 may be an individual TWT parameter set field format according to IEEE 802.11 (e.g., IEEE 802.11ax), and the TWT element 530 may be a broadcast TWT parameter set field format according to IEEE 802.11 (e.g., IEEE 802.11ax). The TWT element included in the TWT request frame 410 and/or the TWT response frame 430 may be the TWT element 510 or the TWT element 530.

According to an example embodiment, the TWT element 510 may include a request type field, a TWT field, a TWT group assignment field, a nominal minimum TWT wake duration field, a TWT wake interval mantissa field, a TWT channel field (or an N field), and a null data packet (NDP) paging field. In this case, the request type field may include a plurality of sub-fields, for example, a TWT request field, a TWT setup command field, a trigger field, an implicit field, a flow type field, a TWT flow identifier field, a TWT wake interval exponent field, and a TWT protection field.

According to an example embodiment, the TWT element 530 may include a request type field, a TWT field, a nominal minimum TWT wake duration field, a TWT wake interval mantissa field, and a broadcast TWT information field. In this case, the request type field may include a plurality of sub-fields, for example, a TWT request field, a TWT setup command field, a trigger field, a last broadcast parameter set field, a flow type field, a broadcast TWT recommendation field, a TWT wake interval exponent field, and a reserved field.

According to an example embodiment, the TWT parameter (e.g., start time information of a TWT service period, TWT duration information of the TWT service period, and/or TWT interval information of the TWT service period) may be determined by setting a value of at least one of the plurality of fields included in the TWT element (e.g., the TWT element 510 or 530). In the TWT field of the TWT element 510 or 530, a start point at which the TWT service period starts may be set. In the nominal minimum TWT wake duration field of the TWT element 510 or 530, a TWT duration for which the TWT service period lasts or is maintained may be set. A TWT interval (e.g., an interval value) of the TWT service period may be determined by values set in the TWT wake interval mantissa field and the TWT wake interval exponent field of the TWT element 510 or 530. In the TWT wake interval mantissa field, information on a mantissa for determining the TWT interval may be set. In the TWT wake interval exponent field, information on an exponent value for determining the TWT interval having 2 as a base may be set. The size of the TWT interval may be determined based on a value of TWT wake interval mantissa$\times 2^{(TWT\ wake\ interval\ exponent)}$.

According to an example embodiment, for example, as the first STA 301 transmits the TWT request frame 410 including the TWT element 510 or 530 to the second STA 302, and the second STA 302 transmits the TWT response frame 430 including the TWT element 510 or 530 in response to the TWT request frame 410, the TWT negotiation for TWT setup between the first STA 301 and the second STA 302 may thereby be performed. The TWT response frame 430 may further include information indicating an accept TWT or a reject TWT. The accept TWT may indicate acceptance of a value of the TWT parameter requested by the first STA 301 which is the TWT requesting STA, and the reject TWT may indicate rejection of the value of the TWT parameter requested by the first STA 301 which is the TWT requesting STA.

Figure 6A:
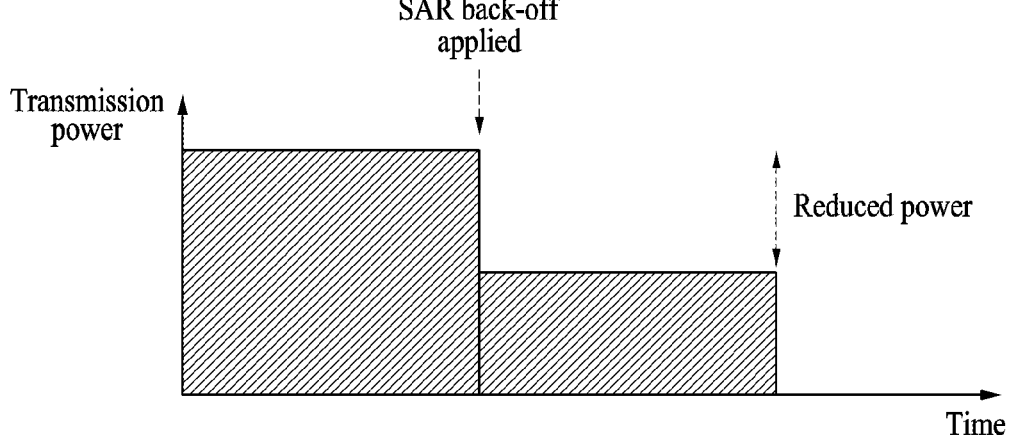
FIGS. 6A and 6B are diagrams illustrating a specific absorption rate (SAR) backoff protocol according to an embodiment.
Figure 6B:
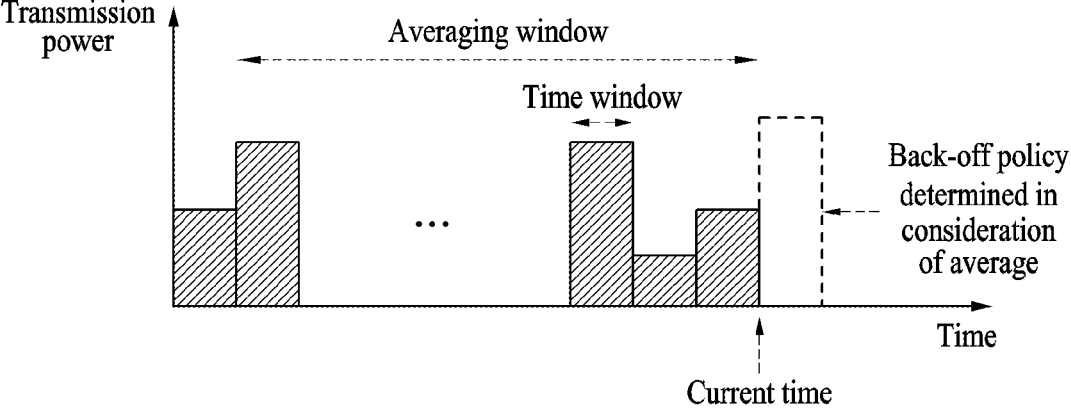

FIGS. 6A and 6B are diagrams illustrating an example specific absorption rate (SAR) backoff protocol according to an embodiment.

According to an example embodiment, wireless communication may be performed in a manner that a transmitting end of an electronic device emits electromagnetic waves to a wireless medium and a receiving end of an external electronic device receives the emitted electromagnetic waves. In this case, when there is a person in a space where electromagnetic waves are emitted and received, considerable electromagnetic waves may be absorbed by the human body. Recent studies have reported that electromagnetic waves absorbed by the human body may have various adverse effects on health. For example, when the transmitting and receiving ends are in close contact with the human body, an electromagnetic wave absorption rate may soar, and thus most countries regulate such a human body electromagnetic wave absorption rate for smart devices. Most smart devices use a WLAN, and thus the WLAN may also be subject to the same regulation. Most countries have defined standards for SAR which indicate electromagnetic wave energy absorbed by the human body, and it is becoming mandatory for smart devices to meet the standards.

FIG. 6A illustrates an example of a SAR backoff protocol performed to respond to a regulation of the human body's electromagnetic wave absorption according to an example embodiment. The SAR backoff protocol may be a protocol for controlling transmission power. According to the SAR backoff protocol, a smart device may use high transmission power when it is determined not to be near a human body. The smart device may reduce the transmission power when it is determined to be near a human body.

According to an example embodiment, a smart device may be equipped with various connectivity solutions (CSs) such as LTE and 5G, in addition to a WLAN. In a situation where a plurality of CSs is operating simultaneously, a sum of electromagnetic wave energy emitted by the CSs may be subject to the regulation. In this case, the smart device may reduce transmission power output by each of the CSs within the limit of a total energy budget. As described above, controlling the transmission power to satisfy the regulation of electromagnetic waves to be absorbed by a human body is referred to as the SAR backoff protocol. The example of the SAR backoff protocol shown in FIG. 6A may be a protocol that uniformly applies a power limit to all transmissions at a certain point in time (e.g., when a human body approaches a device). An influence of electromagnetic waves on a human body should be calculated in terms of a total amount of energy of electromagnetic waves exposed for a certain period of time. The SAR backoff protocol shown in FIG. 6A may thus be inefficient. For example, when a transmission is hardly performed due to extremely small traffic, a total amount of electromagnetic waves exposed to a human body may be insignificant even when a high transmission power is used. Due to the transmission power limit that does not necessarily need to be applied, the user experience may deteriorate.

FIG. 6B illustrates an example of a SAR backoff protocol (e.g., a time-averaged SAR (TAS) backoff protocol) performed to respond to a regulation of the human body's absorption of electromagnetic waves according to an example embodiment. The TAS backoff protocol may be a protocol that limits transmission power in terms of a total amount of emitted electromagnetic wave energy within a certain window (e.g., an averaging window). The TAS backoff protocol may limit an average transmission power during the averaging window (e.g., 100 seconds or 60 seconds) to a specific value or less. The TAS backoff protocol may update a TAS backoff regulation value in a unit of a time window that is considerably smaller than the averaging window to satisfy the electromagnetic wave absorption rate regulation.

According to an example embodiment, the TAS backoff protocol may calculate a sum (e.g., an energy usage amount in the time window) of products of a transmission time and a transmission power for all transmissions performed within the time window for each time window (or update interval). The TAS backoff protocol may calculate an energy usage amount of the averaging window by adding all energy usage amounts in all time windows included in the averaging window. The TAS backoff protocol may guide the transmission power of the time window such that an average (e.g., an average transmission power) obtained by dividing the energy usage amount of the averaging window by the averaging window satisfies the regulation. The TAS backoff protocol may calculate an energy budget allocated to each time window. The TAS backoff protocol may determine whether to perform a TAS backoff operation for a corresponding time window based on an energy budget allocated to the time window. The TAS backoff protocol may calculate the TAS backoff regulation value for the time window by dividing the energy budget allocated to the time window by the size of the time window. The TAS backoff protocol may set a TAS backoff regulation value (e.g., a transmission power limit) for a time window when performing the TAS backoff operation. The TAS backoff protocol may not unnecessarily limit a transmission of a subsequent time window even when a substantial transmission is not performed during a time window for which a high transmission power is set.

Figure 7:
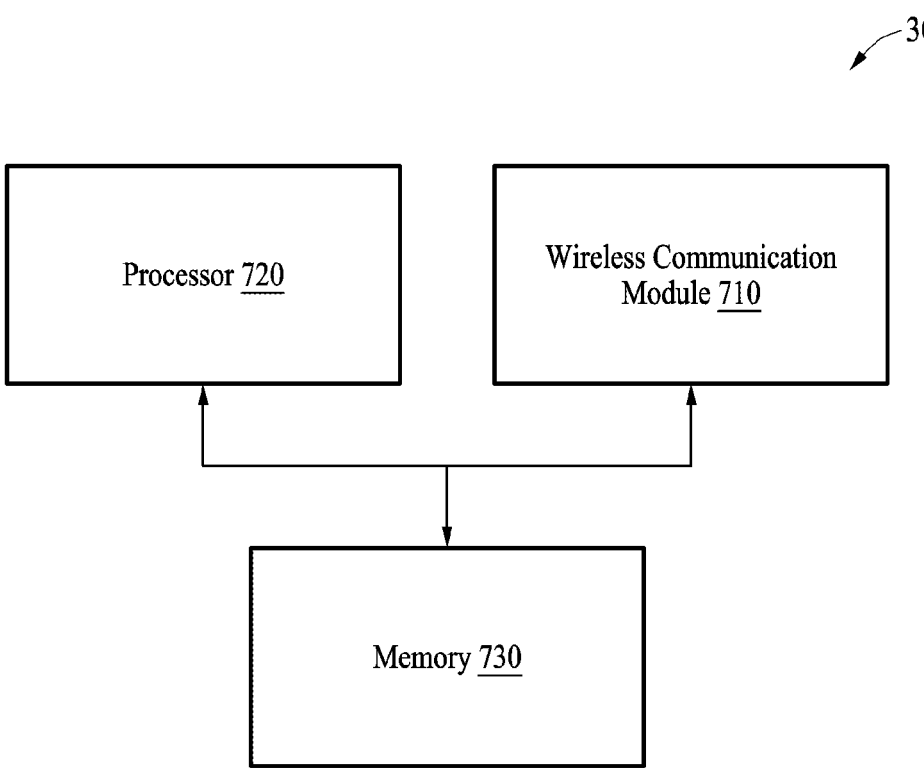
FIG. 7 is a block diagram illustrating an example configuration of a station (STA) according to an embodiment.

FIG. 7 is a block diagram illustrating an example configuration of an STA according to an embodiment.

Referring to FIG. 7, according to an example embodiment, an STA (e.g., the STA 301 of FIG. 3) may perform communication in consideration of a TAS backoff protocol and a TWT protocol. The TAS backoff protocol may be for controlling a transmission power to respond to a regulation relating to the human body's absorption of electromagnetic waves. The TWT protocol may be for distributing occupancy of a wireless medium using a TWT, which is a time resource, to manage activities of the STA 301 in a BSS. The STA 301 may include a wireless communication module (e.g., including communication circuitry) 710 (e.g., a wireless communication module 1492 of FIG. 14), a processor (e.g., including processing circuitry) 720 (e.g., a processor 1420 of FIG. 14), and a memory 730 (e.g., a memory 1430 of FIG. 14). The wireless communication module 710 may be configured to transmit and receive wireless signals. The wireless communication module 710 may include various communication circuitry and may include a Wi-Fi chipset. The processor 720 may include various processing circuitry and be operatively connected to the wireless communication module 710. The memory 730 may be electrically connected to the processor 720 and store instructions executable by the processor 720. The STA 301 may correspond to an electronic device to be described below with reference to FIG. 14 (e.g., an electronic device 1401 of FIG. 14), and thus a description related thereto will not be repeated here.

According to an example embodiment, the processor 720 may check (e.g., determine) whether there is a TWT parameter for a TWT service of the STA 301. The TWT parameter may include start time information of a TWT service period, TWT duration information of the TWT service period, and/or TWT interval information of the TWT service period.

According to an example embodiment, the processor 720 may determine a TAS backoff regulation value for a time window based on the TWT parameter. This operation of determining the TAS backoff regulation value of the wireless communication module 710 may also be performed by a separate processor (not shown) operatively connected to the wireless communication module 710. As described above with reference to FIG. 6B, the TAS backoff regulation value may be a power limit value set for the time window. The processor 720 may calculate a temporary TAS backoff regulation value for the time window based on an energy budget allocated to an averaging window and an energy usage amount that is an amount of energy used during the averaging window. The averaging window may include the time window. According to an example embodiment, the processor 720 may set a TAS duty cycle based on a TWT duty cycle corresponding to the TWT parameter. For example, when the TWT parameter exists, the processor 720 may determine a TAS duty cycle value (e.g., a value obtained by dividing, by the time window, a period in the time window in which communication is performed) based on a TWT duty cycle value (e.g., a value obtained by dividing a TWT duration by a TWT interval) corresponding to the TWT parameter. When the TWT parameter does not exist, the processor 720 may determine the TAS duty cycle value as 1. The processor 720 may determine the TAS backoff regulation value by dividing the temporary TAS backoff regulation value for the time window by the TAS duty cycle value. By setting the TAS duty cycle based on the TWT duty cycle value not being 1, a relatively large TAS backoff regulation value (e.g., a power limit value) may be determined.

According to an example embodiment, the processor 720 may set (e.g., change) the TWT service period at a start point of the time window. To change the TWT service period, the processor 720 may transmit at least one of a TWT setup request frame, a TWT information frame, or a TWT teardown frame at the start point of the time window.

According to an example embodiment, when the TAS backoff regulation value is greater than a required power for communication of the STA 301, the processor 720 may determine the TAS backoff regulation value as the power limit value for the time window. When the TAS backoff regulation value is less than the required power, the processor 720 may determine the required power as the power limit value for the time window. When communication is performed with a value less than the required power, the user experience may deteriorate. Therefore, a change of the TAS duty cycle may be requested based on a comparison between the TAS backoff regulation value and the required power.

According to an example embodiment, when the TAS backoff regulation value is less than the required power, the processor 720 may redetermine the TAS duty cycle value by dividing the temporary TAS backoff regulation value for the time window by the required power. For example, the redetermined duty cycle value may be smaller than the existing duty cycle value, and the processor 720 may thus perform communication with a greater transmission power for a shorter period of time than a time corresponding to the existing duty cycle. The processor 720 may reset the TWT parameter based on the redetermined TAS duty cycle value. The processor 720 may perform communication during the time window based on the reset TWT parameter and the required power.

According to an example embodiment, the processor 720 may match the TWT duty cycle value to the redetermined TAS duty cycle value. The processor 720 may reset the TWT parameter by combining a TWT interval and a TWT duration to satisfy the matched TWT duty cycle value. For example, the processor 720 may determine a combination of the TWT interval and the TWT duration that satisfies the matched TWT duty cycle value based on a service type of a currently running service. An operation of determining a combination of a TWT interval and a TWT duration will be described in greater detail below with reference to FIG. 10.

According to an example embodiment, the processor 720 may efficiently perform TAS backoff control by simultaneously considering the TAS backoff protocol and the TWT protocol.

Figure 8A:
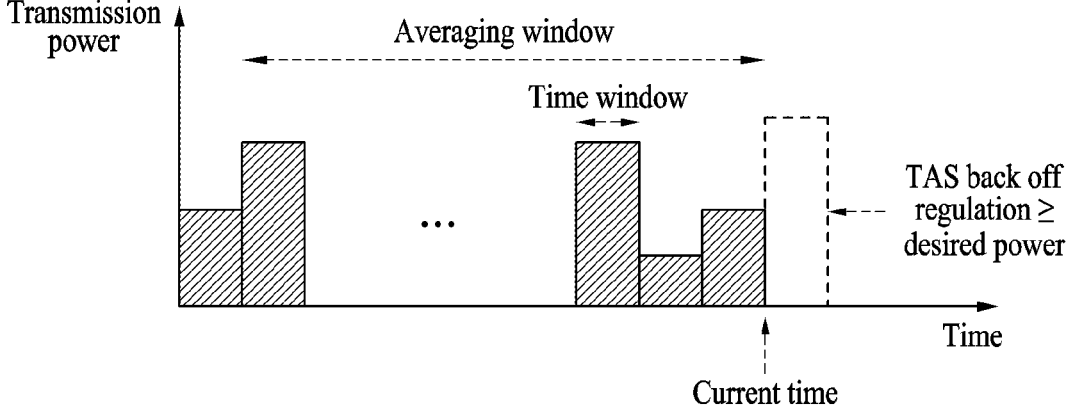
FIGS. 8A and 8B are diagrams illustrating the necessity of changing a time-averaged SAR (TAS) duty cycle according to an embodiment.
Figure 8B:
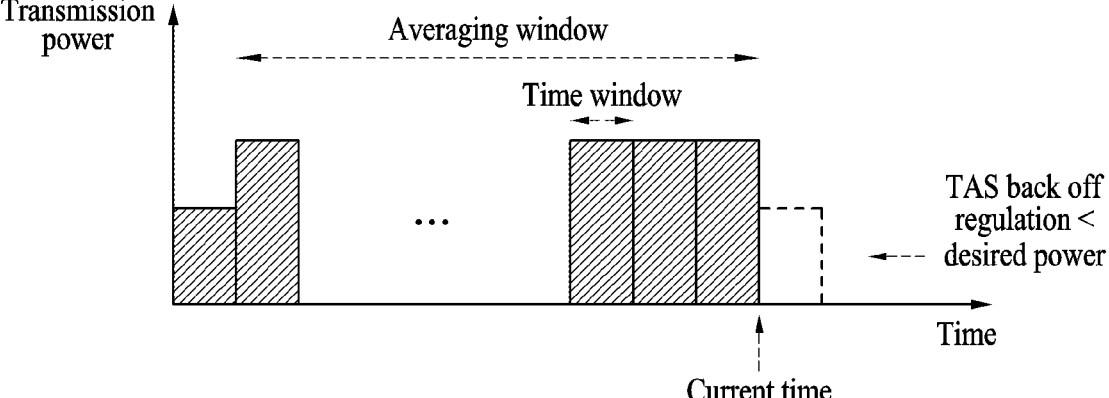

FIGS. 8A and 8B are diagrams illustrating changing a time-averaged SAR (TAS) duty cycle according to an embodiment.

According to an example embodiment, an STA (e.g., the STA 301 of FIG. 3) may perform communication in consideration of a TAS backoff protocol and a TWT protocol. The STA 301 may determine a TAS backoff regulation value for a time window based on a TWT parameter. The STA 301 may change the TWT parameter when there is a need to change the TAS backoff regulation value (e.g., when the TAS backoff regulation value is less than a required power for communication of the STA 301).

FIG. 8A illustrates an example case where a TAS backoff regulation value for a time window of a current time is greater than or equal to a required power according to an example embodiment. Even when the STA 301 performs communication based on the TAS backoff regulation value in such a case shown in FIG. 8A, the user experience may not deteriorate.

FIG. 8B illustrates an example case where a TAS backoff regulation value for a time window of a current time is less than a required power according to an example embodiment. As shown in FIG. 8B, when many transmissions are performed before the time window of the current time and an energy budget allocated to the time window of the current time is relatively small, the TAS backoff regulation value for the time window of the current time may be smaller than the required power. In this case, the following two methods may be considered to satisfy the regulation.

According to an example embodiment, a first method may be performing communication based on a TAS backoff regulation value less than the required power (e.g., based on a transmission power less than the required power). In this case, a result of performing a transmission with the transmission power less than the required power may change depending on a condition of an electric field. For example, when the STA 301 is located near an AP and operates in a strong electric field, there may be no great problem in terms of user experience even when the transmission power is slightly lower than the required power. For another example, when the STA 301 operates in a weak electric field due to being physically far from the AP, the low transmission power of the STA 301 (e.g., the transmission power lower than the required power) may not allow a packet transmitted by the STA 301 to be received by the AP. Therefore, lowering the transmission power in such a condition with a weak electric field may deteriorate the user experience due to the disconnection of a network connection.

According to an example embodiment, a second method may be performing communication by reducing a transmission time instead of the transmission power. For example, a TAS duty cycle may be redetermined when the user experience is expected to deteriorate due to communication performed through a TAS duty cycle based on a previously set TWT parameter and a previously set TAS backoff regulation value. When the TAS backoff regulation value is less than the required power, the STA 301 may redetermine a TAS duty cycle value by dividing the TAS backoff regulation value for the time window by the required power. The redetermined TAS duty cycle value may be smaller than a previously determined TAS duty cycle value (e.g., the transmission time may be reduced when communication is performed based on the redetermined TAS duty cycle value). The STA 301 may reset the TWT parameter based on the redetermined TAS duty cycle value. The STA 301 may match the TWT duty cycle value to the redetermined TAS duty cycle value. The STA 301 may reset the TWT parameter by combining a TWT interval and a TWT duration such that the TWT duty cycle value matches the redetermined TAS duty cycle value. An operation of combining a TWT interval and a TWT duration to satisfy a new TWT duty cycle value will be described in detail below with reference to FIG. 11.

According to an example embodiment, when there is a need to change the TAS backoff regulation value (e.g., when the TAS backoff regulation value is less than the required power for communication of the STA 301), the STA 301 may change the TAS backoff regulation value based on the TAS backoff protocol and the TWT protocol, thereby improving the user experience.

Figure 9:
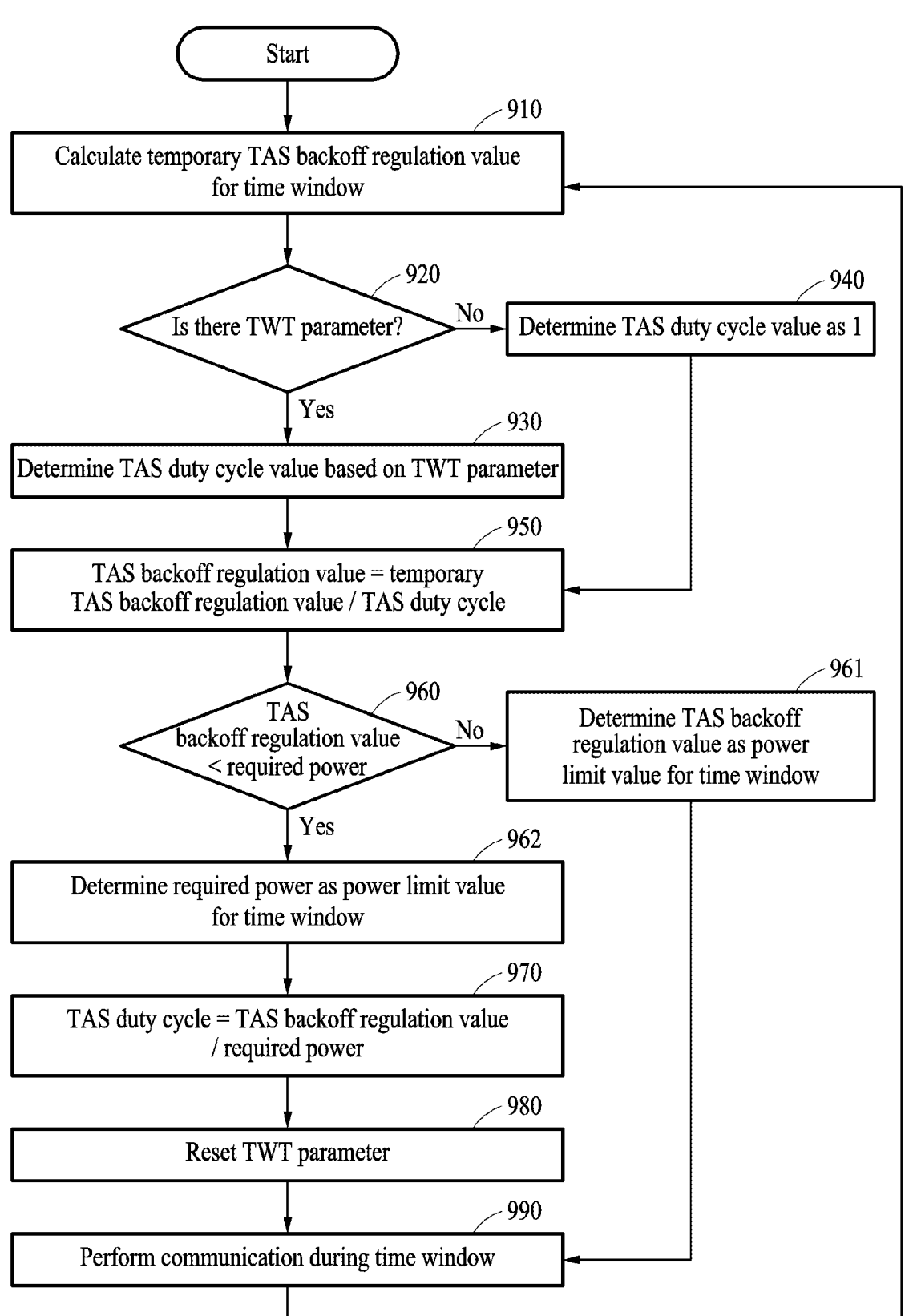
FIG. 9 is a flowchart illustrating an example communication operation performed based on a TAS backoff regulation value and a TWT parameter according to an embodiment.

FIG. 9 is a flowchart illustrating an example communication operation performed based on a TAS backoff regulation value and a TWT parameter according to an embodiment.

Operations 910 to 990 may be performed in sequential order, but not be necessarily performed in sequential order. For example, operations 910 to 990 may be performed in different orders, and at least two of operations 910 to 990 may be performed in parallel.

In operation 910, an STA (e.g., the STA 301 of FIG. 3) may calculate a temporary TAS backoff regulation value for a time window. The STA 301 may calculate the temporary TAS backoff regulation value based on an energy budget allocated to an averaging window and an energy usage amount that is an amount of energy used during the averaging window. A method of calculating the time window, the energy budget, the averaging window, and the TAS backoff regulation value has been described in detail above with reference to FIG. 6B, and thus a repeated description thereof will be omitted here.

In operation 920, the STA 301 may check (e.g., determine) whether there is a TWT parameter for a TWT service. The TWT parameter may include information on a TWT service period. The TWT parameter may include at least one of start time information of the TWT service period, TWT duration information of the TWT service period, and/or TWT interval information of the TWT service period.

In operation 930, when the TWT parameter exists (yes in operation 920), the STA 301 may determine a TAS duty cycle value based on the TWT parameter. The STA 301 may determine the TAS duty cycle value based on a TWT duty cycle value corresponding to the TWT parameter. The STA 301 may match the TAS duty cycle value to the TWT duty cycle value. The TWT duty cycle value may be obtained by dividing a TWT duration by a TWT interval. The TAS duty cycle value may be obtained by dividing, by the time window, a period in which communication is performed in the time window. Operation 930 may be performed under the assumption that a transmission is performed only during the TWT duration. The TWT duty cycle value and the TAS duty cycle value may be zero (0) or more and 1 or less.

In operation 940, when the TWT parameter does not exist (no in operation 920), the STA 301 may determine the TAS duty cycle value as 1. For example, operation 940 may be performed under the assumption that a transmission is performed throughout the time window.

In operation 950, the STA 301 may determine, as the TAS backoff regulation value for the time window, a value obtained by dividing the temporary TAS backoff regulation value by the TAS duty cycle value. The TAS backoff regulation value (e.g., x) determined based on the TAS duty cycle value (e.g., 1) determined in operation 940 may be smaller than the TAS backoff regulation value (e.g., 2x) determined based on the TAS duty cycle value (e.g., 0.5) determined in operation 930. When determining the TAS backoff regulation value, the STA 301 may set a transmission power to be high by considering the TWT duty cycle corresponding to the TWT parameter. The STA 301 may improve the user experience.

In operation 960, the STA 301 may compare the TAS backoff regulation value to a required power for communication of the STA 301. For example, the STA 301 may check whether the TAS backoff regulation value is less than the required power.

In operation 961, when the TAS backoff regulation value is greater than or equal to the required power (no in operation 960), the STA 301 may determine the TAS backoff regulation value as a power limit value for the time window.

In operation 962, when the TAS backoff regulation value is less than the required power (yes in operation 960), the STA 301 may determine the required power as the power limit value for the time window.

In operation 970, the STA 301 may redetermine, as the TAS duty cycle value, a value obtained by dividing the TAS backoff regulation value by the required power.

In operation 980, the STA 301 may reset the TWT parameter based on the redetermined TAS duty cycle value. According to an example embodiment, the STA 301 may match the TWT duty cycle value to the redetermined TAS duty cycle value. For example, the STA 301 may reset the TWT parameter by combining a TWT interval and a TWT duration such that the TWT duty cycle value matches the redetermined TAS duty cycle value. An example of the reset TWT parameter will be described in detail below with reference to FIG. 10.

In operation 990, the STA 301 may perform communication during the time window based on the TWT parameter reset in operation 980 and the required power. The STA 301 may perform communication during the time window based on the TAS backoff regulation value determined in operation 961 and the existing TWT parameter. When there is a need to change the TAS backoff regulation value, for example, when the TAS backoff regulation value is less than the required power for communication of the STA 301, the STA 301 may change the TAS backoff regulation value (e.g., change the TAS backoff regulation value to the required power) to perform communication, thereby improving the user experience.

Figure 10:
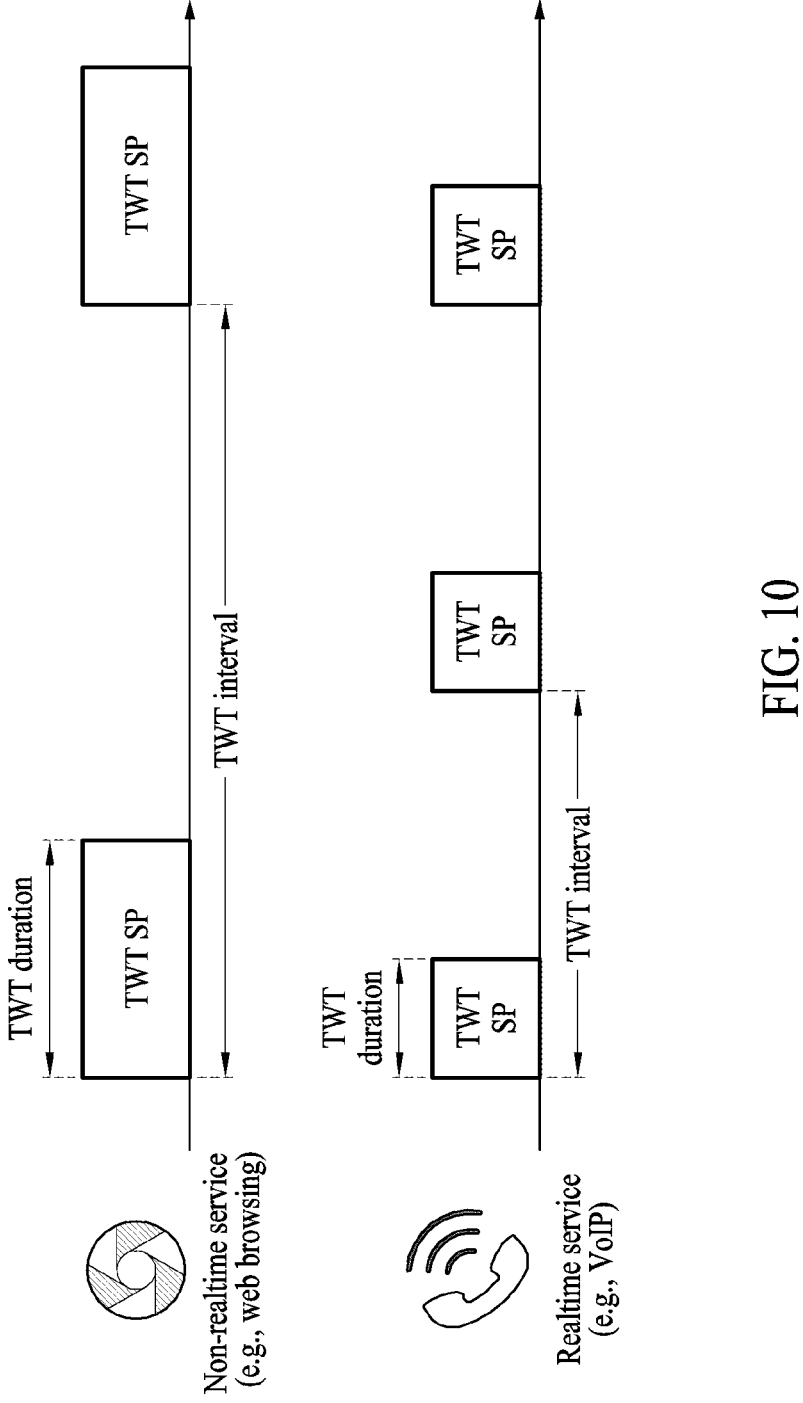
FIG. 10 is a diagram illustrating an example operation of determining a TWT parameter according to an embodiment.

FIG. 10 is a diagram illustrating an example operation of determining a TWT parameter according to an embodiment.

Referring to FIG. 10, according to an example embodiment, an STA (e.g., the STA 301) may determine a TWT parameter with different (or various) TWT interval and TWT duration combinations that satisfy the same TWT duty cycle value. For example, the combinations that satisfy the TWT duty cycle value (e.g., 0.3) may include a combination of a TWT interval (e.g., 100 ms) and a TWT duration (e.g., 30 ms) and a combination of a TWT interval (e.g., 50 ms) and a TWT duration (e.g., 15 ms). The STA 301 may determine the TWT parameter by applying different combinations of TWT intervals and TWT durations that satisfy the same TWT duty cycle value according to a service type of a currently running service, thereby minimizing and/or reducing the deterioration of user experience.

According to an example embodiment, in the case of realtime services such as VoIP, using a combination of a short TWT interval and a short TWT duration that satisfy the TWT duty cycle value may minimize and/or reduce the deterioration of user experience. In the case of non-realtime services such as web browsing, using a combination of a long TWT interval and a long TWT duration that satisfy the same TWT duty cycle value may be effective in terms of handling burst traffic.

FIG. 11 is a diagram illustrating a mode in which communication is possible even outside a TWT service period according to an embodiment.

According to an example embodiment, the intention of introducing a TWT protocol is to perform data transmission and reception within an agreed TWT service period. However, a Wi-Fi standard relating to the TWT protocol does not prohibit data transmission and reception outside the TWT service period. Therefore, an STA (e.g., the STA 301) that simultaneously controls TWT and TAS may perform communication through a first mode that allows data transmission outside the TWT service period and/or through a second mode that does not allow data transmission outside the TWT service period. The STA 301 may internally change an operation mode (e.g., the first mode and the second mode) associated with data transmission. For example, when the STA 301 detects a human body near the STA 301, a TAS backoff protocol needs to be strictly observed. In this case, the STA 301 may perform communication through the second mode. The change of the operation mode of the STA 301 may be based on its own decision (or determination) made by the STA 301. The change of the operation mode of the STA 301 may not require a negotiation (or a frame exchange) with another device. The change of the operation mode of the STA 301 may be performed by an interaction between a wireless communication module (e.g., the communication module 710 of FIG. 7) (e.g., a Wi-Fi chipset) and a processor (e.g., the processor 720 of FIG. 7).

Figure 12:
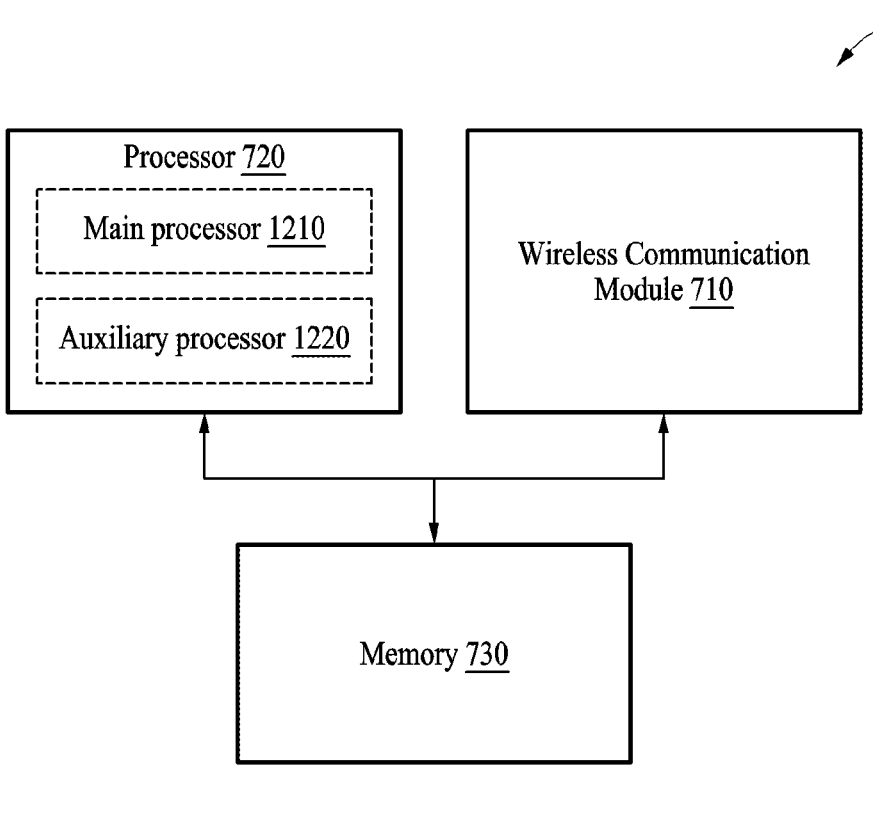
FIG. 12 is a block diagram illustrating an example configuration of an STA according to an embodiment.

FIG. 12 is a block diagram illustrating an example configuration of an STA according to an embodiment.

Referring to FIG. 12, according to an example embodiment, an STA (e.g., the STA 301 of FIG. 3) may distribute an energy budget allocated to the entire STA 301 to a wireless communication module (e.g., including communication circuitry) 710 or an auxiliary processor (e.g., including processing circuitry) 1220. The STA 301 may include the wireless communication module 710 (e.g., a wireless communication module 1492 of FIG. 14), a processor (e.g., including processing circuitry) 720 (e.g., a processor 1420 of FIG. 14), and a memory 730 (e.g., a memory 1430 of FIG. 14). The wireless communication module 710 may be configured to transmit and receive wireless signals. The wireless communication module 710 may include various communication circuitry and include a Wi-Fi chipset. The processor 720 may include various processing circuitry and be operatively connected to the wireless communication module 710. The processor 720 may include a main processor (e.g., including processing circuitry) 1210 (e.g., a main processor 1421 of FIG. 14) and the auxiliary processor 1220 (e.g., an auxiliary processor 1423 of FIG. 14). The memory 730 may be electrically connected to the processor 720 and configured to store instructions executable by the processor 720. The STA 301 may correspond to an electronic device to be described below with reference to FIG. 14 (e.g., an electronic device 1401 of FIG. 14), and thus a description related thereto will not be repeated here.

According to an example embodiment, the STA 301 may include modules related to various connectivity solutions (CSs) (e.g., Wi-Fi, LTE, or 5G). The STA 301 may include the wireless communication module 710 (e.g., a Wi-Fi chipset) related to a WLAN (e.g., Wi-Fi) and the auxiliary processor 1220 (e.g., a communication processor) related to a cellular network (e.g., LTE or 5G). The operations described above with reference to FIGS. 1 to 11 may be performed substantially by the main processor 1210. The main processor 1210 may check whether there is a TWT parameter for a TWT service. The main processor 1210 may determine a TAS backoff regulation value for a time window based on the TWT parameter. The auxiliary processor 1220 (e.g., a communication processor) and the wireless communication module 710 (e.g., a Wi-Fi chipset) may perform communication based on the TWT parameter and the TAS backoff regulation value determined by the main processor 1210. This operation of determining the TAS backoff regulation value of the wireless communication module 710 may also be performed by a separate processor (not shown) operatively connected to the wireless communication module 710.

According to an example embodiment, when a plurality of CS modules included in the STA 301 operate, an operation of distributing the energy budget allocated to the entire STA 301 to each of the CS modules may be required. The STA 301 may set a distribution priority based on an amount of traffic that is scheduled to be used by each CS module. Basically, such a traffic usage amount may be highly variable. If traffic prediction is inaccurate, an excessive energy budget may be allocated to a CS module that would not use traffic, and an insufficient energy budget may be allocated to a CS module that would use a great amount of traffic. The STA 301 may accurately predict traffic of the wireless communication module 710 (e.g., a Wi-Fi chipset) by considering a TWT protocol of the wireless communication module 710. The STA 301 may perform energy distribution between the CS modules by referring to a TWT duty cycle value corresponding to the TWT parameter such that a sufficient energy budget is secured for the wireless communication module 710 within a TWT duty cycle.

Figure 13A:
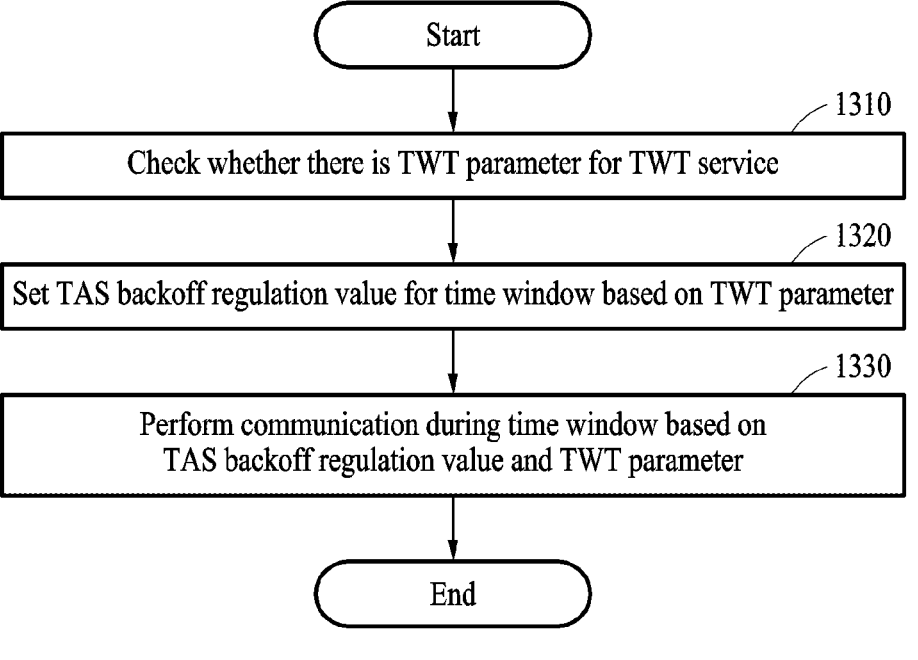
FIG. 13A is a flowchart illustrating an example method of operating an STA according to an embodiment.

FIG. 13A is a flowchart illustrating an example method of operating an STA according to an embodiment.

Operations 1310 to 1330 may be performed in sequential order, but not be necessarily performed in sequential order. For example, operations 1310 to 1330 may be performed in different orders, and at least two of operations 1310 to 1330 may be performed in parallel.

In operation 1310, an STA (e.g., the STA 301 of FIG. 3) may check (e.g., determine) whether there is a TWT parameter for a TWT service. The TWT parameter may include start time information of a TWT service period, TWT duration information of the TWT service period, and/or TWT interval information of the TWT service period.

In operation 1320, the STA 301 may determine (e.g., set) a TAS backoff regulation value for a time window based on the TWT parameter. The TAS backoff regulation value may be a power limit value set for the time window. The processor 720 may calculate a temporary TAS backoff regulation value for the time window, based on an energy budget allocated to an averaging window and an energy usage amount that is an amount of energy used during the averaging window. The averaging window may include the time window. According to an example embodiment, the processor 720 may set a TAS duty cycle based on a TWT duty cycle corresponding to the TWT parameter. For example, when the TWT parameter exists, the processor 720 may determine a TAS duty cycle value (e.g., a value obtained by dividing, by the time window, a period in which communication is performed in the time window) based on a TWT duty cycle value (e.g., a value obtained by dividing a TWT duration by a TWT interval) corresponding to the TWT parameter. When the TWT parameter does not exist, the processor 720 may determine the TAS duty cycle value as 1. The processor 720 may determine the TAS backoff regulation value by dividing the temporary TAS backoff regulation value for the time window by the TAS duty cycle value. By setting the TAS duty cycle based on the TWT duty cycle value that is not 1, a relatively great TAS backoff regulation value (e.g., the power limit value) may be determined.

In operation 1330, the STA 301 may perform communication during the time window based on the TAS backoff regulation value and the TWT parameter.

Figure 13B:
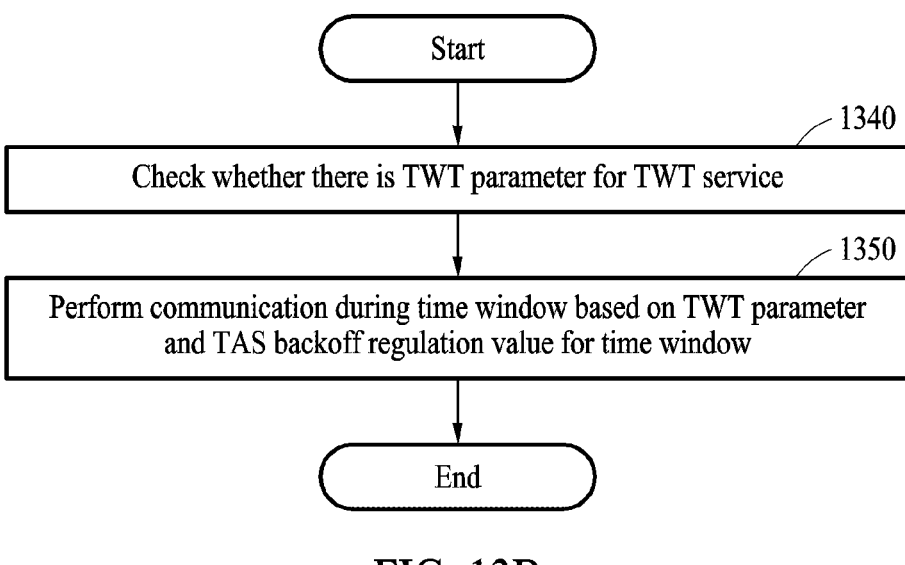
FIG. 13B is a flowchart illustrating an example method of operating an STA according to an embodiment.

FIG. 13B is a flowchart illustrating an example method of operating an STA according to an embodiment.

Operations 1340 and 1350 may be performed in sequential order, but not be necessarily performed in sequential order. For example, operations 1340 and 1350 may be performed in different orders, and at least two of operations 1340 and 1350 may be performed in parallel.

In operation 1340, an STA (e.g., the STA 301 of FIG. 3) may check (e.g., determine) whether there is a TWT parameter for a TWT service.

In operation 1350, the STA 301 may perform communication during a time window based on a TAS backoff regulation value for the time window and the TWT parameter. The TWT parameter may include at least one of start time information of a TWT service period, TWT duration information of the TWT service period, or TWT interval information of the TWT service period. The TAS backoff regulation value for the time window may be determined based on the TWT parameter.

Figure 13C:
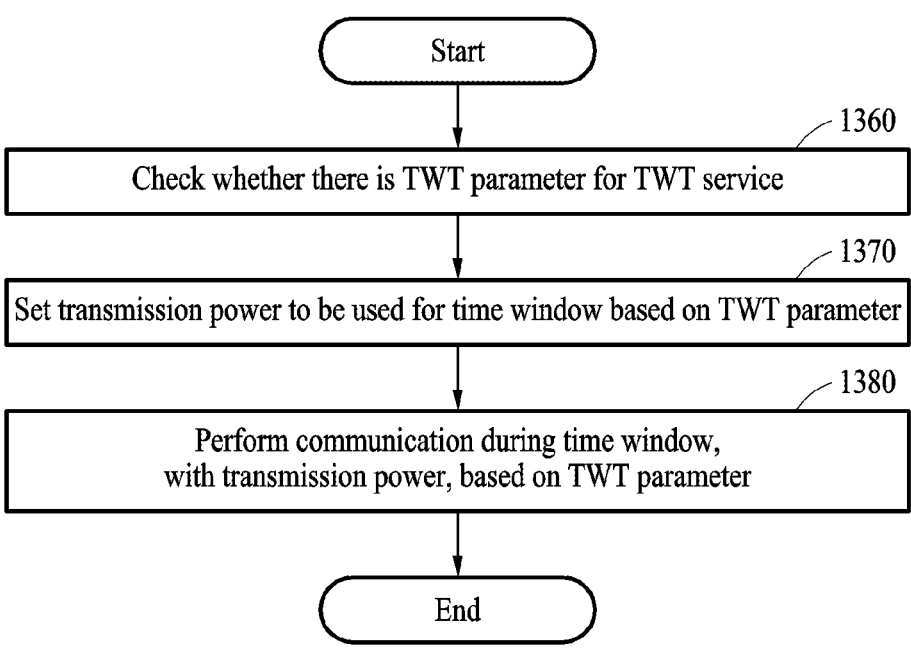
FIG. 13C is a flowchart illustrating an example method of operating an STA according to an embodiment.

FIG. 13C is a flowchart illustrating an example method of operating an STA according to an embodiment.

Operations 1360 to 1380 may be performed in sequential order, but not be necessarily performed in sequential order. For example, operations 1360 to 1380 may be performed in different orders, and at least two of operations 1360 to 1380 may be performed in parallel.

In operation 1360, an STA (e.g., the STA 301 of FIG. 3) may check (e.g., determine) whether there is a TWT parameter for a TWT service.

In operation 1370, the STA 301 may set (e.g., change) a transmission power to be used during a time window based on the TWT parameter. The transmission power may be obtained based on the TWT parameter and a TAS backoff regulation value for the time window.

In operation 1380, the STA 301 may perform communication during the time window, with the transmission power, based on the TWT parameter.

FIG. 14 is a block diagram illustrating an example electronic device in a network environment according to an embodiment. Referring to FIG. 14, an electronic device 1401 in a network environment 1400 may communicate with an electronic device 1402 via a first network 1498 (e.g., a short-range wireless communication network), or communicate with at least one of an electronic device 1404 and a server 1408 via a second network 1499 (e.g., a long-range wireless communication network). According to an example embodiment, the electronic device 1401 may communicate with the electronic device 1404 via the server 1408. According to an example embodiment, the electronic device 1401 may include a processor 1420 (e.g., the processor 720 of FIG. 12), a memory 1430 (e.g., the memory 730 of FIG. 12), an input module 1450, a sound output module 1455, a display module 1460, an audio module 1470, and a sensor module 1476, an interface 1477, a connecting terminal 1478, a haptic module 1479, a camera module 1480, a power management module 1488, a battery 1489, a communication module 1490 (e.g., the communication module 710 of FIG. 12), a subscriber identification module (SIM) 1496, or an antenna module 1497. In various embodiments, at least one (e.g., the connecting terminal 1478) of the above components may be omitted from the electronic device 1401, or one or more other components may be added to the electronic device 1401. In various embodiments, some (e.g., the sensor module 1476, the camera module 1480, or the antenna module 1497) of the components may be integrated as a single component (e.g., the display module 1460).

The processor 1420 may execute, for example, software (e.g., a program 1440) to control at least one other component (e.g., a hardware or software component) of the electronic device 1401 connected to the processor 1420 and may perform various data processing or computations. According to an example embodiment, as at least a part of data processing or computations, the processor 1420 may store a command or data received from another component (e.g., the sensor module 1476 or the communication module 1490) in a volatile memory 1432, process the command or data stored in the volatile memory 1432, and store resulting data in a non-volatile memory 1434. According to an example embodiment, the processor 1420 may include a main processor 1421 (e.g., a central processing unit (CPU) or an application processor (AP)) or an auxiliary processor 1423 (e.g., a graphics processing unit (GPU), a neural processing unit (NPU), an image signal processor (ISP), a sensor hub processor, or a communication processor (CP)) that is operable independently from or in conjunction with, the main processor 1421. For example, when the electronic device 1401 includes the main processor 1421 and the auxiliary processor 1423, the auxiliary processor 1423 may be adapted to consume less power than the main processor 1421 or to be specific to a specified function. The auxiliary processor 1423 may be implemented separately from the main processor 1421 or as a part of the main processor 1421.

The auxiliary processor 1423 may control at least some of functions or states related to at least one (e.g., the display device 1460, the sensor module 1476, or the communication module 1490) of the components of the electronic device 1401, instead of the main processor 1421 while the main processor 1421 is in an inactive (e.g., sleep) state or along with the main processor 1421 while the main processor 1421 is an active state (e.g., executing an application). According to an example embodiment, the auxiliary processor 1423 (e.g., an ISP or a CP) may be implemented as a portion of another component (e.g., the camera module 1480 or the communication module 1490) that is functionally related to the auxiliary processor 1423. According to an example embodiment, the auxiliary processor 1423 (e.g., an NPU) may include a hardware structure specifically for artificial intelligence (AI) model processing. An AI model may be generated by machine learning. The machine learning may be performed by, for example, the electronic device 1401, in which the AI model is performed, or performed via a separate server (e.g., the server 1408). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may alternatively or additionally include a software structure other than the hardware structure.

The memory 1430 may store various pieces of data used by at least one component (e.g., the processor 1420 or the sensor module 1476) of the electronic device 1401. The various pieces of data may include, for example, software (e.g., the program 1440) and input data or output data for a command related thereto. The memory 1430 may include the volatile memory 1432 or the non-volatile memory 1434. The non-volatile memory 1434 may include an internal memory 1436 and an external memory 1438.

The program 1440 may be stored as software in the memory 1430 and may include, for example, an operating system (OS) 1442, middleware 1444, or an application 1446.

The input module 1450 may receive, from outside (e.g., a user) the electronic device 1401, a command or data to be used by another component (e.g., the processor 1420) of the electronic device 1401. The input module 1450 may include, for example, a microphone, a mouse, a keyboard, a key (e.g., a button), or a digital pen (e.g., a stylus pen).

The sound output module 1455 may output a sound signal to the outside of the electronic device 1401. The sound output module 1455 may include, for example, a speaker or a receiver. The speaker may be used for general purposes, such as playing multimedia or playing a recording. The receiver may be used to receive an incoming call. According to an example embodiment, the receiver may be implemented separately from the speaker or as a part of the speaker.

The display module 1460 may visually provide information to the outside (e.g., a user) of the electronic device 1401. The display module 1460 may include, for example, a display, a hologram device, or a projector, and a control circuitry for controlling a corresponding one of the display, the hologram device, and the projector. According to an example embodiment, the display module 1460 may include a touch sensor adapted to sense a touch, or a pressure sensor adapted to measure an intensity of a force of the touch.

The audio module 1470 may convert sound into an electric signal or vice versa. According to an example embodiment, the audio module 1470 may obtain the sound via the input module 1450 or output the sound via the sound output module 1455 or an external electronic device (e.g., the electronic device 1402, such as a speaker or headphones) directly or wirelessly connected to the electronic device 1401.

The sensor module 1476 may detect an operational state (e.g., power or temperature) of the electronic device 1401 or an environmental state (e.g., a state of a user) external to the electronic device 1401 and generate an electric signal or data value corresponding to the detected state. According to an example embodiment, the sensor module 1476 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, an illuminance sensor, or a fingerprint sensor.

The interface 1477 may support one or more specified protocols to be used by the electronic device 1401 to couple with an external electronic device (e.g., the electronic device 1402) directly (e.g., by wire) or wirelessly. According to an example embodiment, the interface 1477 may include, for example, a high-definition multimedia interface (HDMI), a universal serial bus (USB) interface, a secure digital (SD) card interface, or an audio interface.

The connecting terminal 1478 may include a connector via which the electronic device 1401 may physically connect to an external electronic device (e.g., the electronic device 1402). According to an example embodiment, the connecting terminal 1478 may include, for example, an HDMI connector, a USB connector, an SD card connector, or an audio connector (e.g., a headphones connector).

The haptic module 1479 may convert an electric signal into a mechanical stimulus (e.g., a vibration or a movement) or an electrical stimulus, which may be recognized by a user via their tactile sensation or kinesthetic sensation. According to an example embodiment, the haptic module 1479 may include, for example, a motor, a piezoelectric element, or an electric stimulator.

The camera module 1480 may capture a still image and moving images. According to an example embodiment, the camera module 1480 may include one or more lenses, image sensors, ISPs, and flashes.

The power management module 1488 may manage power supplied to the electronic device 1401. According to an example embodiment, the power management module 1488 may be implemented as, for example, at least a part of a power management integrated circuit (PMIC).

The battery 1489 may supply power to at least one component of the electronic device 1401. According to an example embodiment, the battery 1489 may include, for example, a primary cell, which is not rechargeable, a secondary cell, which is rechargeable, or a fuel cell.

The communication module 1490 may support establishing a direct (e.g., wired) communication channel or a wireless communication channel between the electronic device 1401 and an external electronic device (e.g., the electronic device 1402, the electronic device 1404, or the server 1408) and performing communication via the established communication channel. The communication module 1490 may include one or more CPs that are operable independently from the processor 1420 (e.g., an AP) and that support direct (e.g., wired) communication or wireless communication. According to an example embodiment, the communication module 1490 may include a wireless communication module 1492 (e.g., a cellular communication module, a short-range wireless communication module, or a global navigation satellite system (GNSS) communication module) or a wired communication module 1494 (e.g., a local area network (LAN) communication module or a power line communication (PLC) module). A corresponding one of these communication modules may communicate with the external electronic device, for example, the electronic device 1404, via the first network 1498 (e.g., a short-range communication network, such as Bluetooth™, wireless-fidelity (Wi-Fi) direct, or infrared data association (IrDA)) or the second network 1499 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multiple components (e.g., multiple chips) separate from each other. The wireless communication module 1492 may identify and authenticate the electronic device 1401 in a communication network, such as the first network 1498 or the second network 1499, using subscriber information (e.g., international mobile subscriber identity (IMSI)) stored in the SIM 1496.

The wireless communication module 1492 may support a 5G network after a 4G network and next-generation communication technology (e.g., new radio (NR) access technology). The NR access technology may support enhanced mobile broadband (eMBB), massive machine type communications (mMTC), or ultra-reliable and low-latency communications (URLLC). The wireless communication module 1492 may support a high-frequency band (e.g., a mmWave band) to achieve, e.g., a high data transmission rate. The wireless communication module 1492 may support various technologies for securing performance on a high-frequency band, such as, e.g., beamforming, massive multiple-input and multiple-output (MIMO), full dimensional MIMO (FD-MIMO), an antenna array, analog beamforming, or a large-scale antenna. The wireless communication module 1492 may support various requirements specified in the electronic device 1401, an external electronic device (e.g., the electronic device 1404), or a network system (e.g., the second network 1499). According to an example embodiment, the wireless communication module 1492 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1497 may transmit or receive a signal or power to or from the outside (e.g., an external electronic device) of the electronic device 1401. According to an example embodiment, the antenna module 1497 may include an antenna including a radiating element including a conductive material or a conductive pattern formed in or on a substrate (e.g., a printed circuit board (PCB)). According to an example embodiment, the antenna module 1497 may include a plurality of antennas (e.g., an antenna array). In such a case, at least one antenna appropriate for a communication scheme used in a communication network, such as the first network 1498 or the second network 1499, may be selected by, for example, the communication module 1490 from the plurality of antennas. The signal or power may be transmitted or received between the communication module 1490 and the external electronic device via the at least one selected antenna. According to an example embodiment, another component (e.g., a radio frequency integrated circuit (RFIC)) other than the radiating element may be additionally formed as a part of the antenna module 1497.

According to various example embodiments, the antenna module 1497 may form a mmWave antenna module. According to an example embodiment, the mmWave antenna module may include a PCB, an RFIC on a first surface (e.g., a bottom surface) of the PCB, or adjacent to the first surface of the PCB and capable of supporting a designated high-frequency band (e.g., a mmWave band), and a plurality of antennas (e.g., an antenna array) disposed on a second surface (e.g., a top or a side surface) of the PCB, or adjacent to the second surface of the PCB and capable of transmitting or receiving signals in the designated high-frequency band.

At least some of the above-described components may be coupled mutually and exchange signals (e.g., commands or data) therebetween via an inter-peripheral communication scheme (e.g., a bus, general-purpose input and output (GPIO), serial peripheral interface (SPI), or mobile industry processor interface (MIPI)).

According to an example embodiment, commands or data may be transmitted or received between the electronic device 1401 and the external electronic device (e.g., the electronic device 1404) via the server 1408 coupled with the second network 1499. Each of the external electronic devices (e.g., the electronic device 1402 and 1404) may be a device of the same type as or a different type from the electronic device 1401. According to an example embodiment, all or some of operations to be executed by the electronic device 1401 may be executed by one or more of the external electronic devices (e.g., the electronic devices 1402 and 1404, and the server 1408). For example, if the electronic device 1401 needs to perform a function or a service automatically, or in response to a request from a user or another device, the electronic device 1401, instead of, or in addition to, executing the function or the service, may request one or more external electronic devices to perform at least a part of the function or service. The one or more external electronic devices receiving the request may perform the at least part of the function or service requested, or an additional function or an additional service related to the request, and may transfer a result of the performance to the electronic device 1401. The electronic device 1401 may provide the result, with or without further processing of the result, as at least a part of a response to the request. To that end, cloud computing, distributed computing, mobile edge computing (MEC), or client-server computing technology may be used, for example. The electronic device 1401 may provide ultra-low latency services using, e.g., distributed computing or MEC. In an embodiment, the external electronic device (e.g., the electronic device 1404) may include an Internet-of-things (IoT) device. The server 1408 may be an intelligent server using machine learning and/or a neural network. According to an example embodiment, the external electronic device (e.g., the electronic device 1404) or the server 1408 may be included in the second network 1499. The electronic device 1401 may be applied to intelligent services (e.g., a smart home, a smart city, a smart car, or healthcare) based on 5G communication technology or IoT-related technology.

According to various example embodiments described herein, an electronic device may be a device of one of various types. The electronic device may include, as non-limiting examples, a portable communication device (e.g., a smartphone, etc.), a computing device, a portable multimedia device, a portable medical device, a camera, a wearable device, a home appliance, or the like. However, the electronic device is not limited to the examples described above.

It should be appreciated that various embodiments of the present disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things unless the relevant context clearly indicates otherwise. As used herein, "A or B," "at least one of A and B," "at least one of A or B," "A, B, or C," "at least one of A, B, and C," and "A, B, or C," each of which may include any one of the items listed together in the corresponding one of the phrases, or all possible combinations thereof. Terms such as "first," "second," or "initial" or "next" or "subsequent" may simply be used to distinguish the component from other components in question, and do not limit the components in other aspects (e.g., importance or order). It is to be understood that if an element (e.g., a first element) is referred to, with or without the term "operatively" or "communicatively," as "coupled with," "coupled to," "connected with," or "connected to" another element (e.g., a second element), the element may be coupled with the other element directly (e.g., by wire), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry." A module may be a single integral component, or a minimum unit or part thereof, adapted to perform one or more functions. For example, according to an example embodiment, the module may be implemented in the form of an application-specific integrated circuit (ASIC).

Various embodiments set forth herein may be implemented as software (e.g., the program 1440) including one or more instructions that are stored in a storage medium (e.g., the internal memory 1436 or the external memory 1438) that is readable by a machine (e.g., the electronic device 1401). For example, a processor (e.g., the processor 1420) of the machine (e.g., the electronic device 1401) may invoke at least one of the one or more instructions stored in the storage medium and execute it. This allows the machine to be operated to perform at least one function according to the at least one instruction invoked. The one or more instructions may include code generated by a compiler or code executable by an interpreter. The machine-readable storage medium may be provided in the form of a non-transitory storage medium. Here, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to various example embodiments, a method according to an example embodiment of the disclosure may be included and provided in a computer program product. The computer program product may be traded as a product between a seller and a buyer. The computer program product may be distributed in the form of a machine-readable storage medium (e.g., a compact disc read-only memory (CD-ROM)), or be distributed (e.g., downloaded or uploaded) online via an application store (e.g., PlayStore™) or between two user devices (e.g., smart phones) directly. If distributed online, at least part of the computer program product may be temporarily generated or at least temporarily stored in the machine-readable storage medium, such as a memory of the manufacturer's server, a server of the application store, or a relay server.

According to various example embodiments, each component (e.g., a module or a program) of the above-described components may include a single entity or multiple entities, and some of the multiple entities may be separately disposed in different components. According to various example embodiments, one or more of the above-described components or operations may be omitted, or one or more other components or operations may be added. Alternatively or additionally, a plurality of components (e.g., modules or programs) may be integrated into a single component. In such a case, according to various example embodiments, the integrated component may still perform one or more functions of each of the plurality of components in the same or similar manner as they are performed by a corresponding one of the plurality of components before the integration. According to various example embodiments, operations performed by the module, the program, or another component may be carried out sequentially, in parallel, repeatedly, or heuristically, or one or more of the operations may be executed in a different order or omitted, or one or more other operations may be added.

According to various example embodiments, an electronic device (e.g., the STA 301 of FIG. 3 or the electronic device 1401 of FIG. 14) may include: at least one wireless communication module comprising communication circuitry (e.g., the wireless communication module 710 of FIG. 7 and the wireless communication module 1492 of FIG. 14) configured to transmit and receive a wireless signal; at least one processor (e.g., the processor 720 of FIG. 7 and the processor 1420 of FIG. 14) operatively connected to the wireless communication module; a memory (e.g., the memory 730 of FIG. 7 and the memory 1430 of FIG. 14) electrically connected to the processor and configured to store instructions executable by the processor. In response to the instructions being executed by the processor, the processor may be configured to: determine whether there is a target wake time (TWT) parameter for a TWT service. The processor may be configured to determine a time-averaged specific absorption rate (TAS) backoff regulation value for a time window based on the TWT parameter. The processor may be configured to control the wireless communication module to perform communication during the time window based on the TAS backoff regulation value and the TWT parameter.

According to an example embodiment, the TWT parameter may include at least one of start time information of a TWT service period, TWT duration information of the TWT service period, or TWT interval information of the TWT service period.

According to an example embodiment, the processor may be configured to control the wireless communication module to transmit at least one of a TWT setup request frame, a TWT information frame, or a TWT teardown frame at a start point of the time window.

According to an example embodiment, the processor may be configured to: calculate a temporary backoff regulation value for the time window based on an energy budget allocated to an averaging window and an energy usage amount that is an amount of energy used during the averaging window. The averaging window may include the time window.

According to an example embodiment, based on the TWT parameter existing, the processor may be configured to determine a TAS duty cycle value based on a TWT duty cycle value corresponding to the TWT parameter. Based on the TWT parameter not existing, the processor may be configured to determine the TAS duty cycle value as 1.

According to an example embodiment, the TWT duty cycle value may be obtained by dividing a TWT duration by a TWT interval. The TAS duty cycle value may be obtained by dividing, by the time window, a period in which communication is performed in the time window.

According to an example embodiment, the processor may be configured to determine the TAS backoff regulation value for the time window by dividing the temporary TAS backoff regulation value by the TAS duty cycle value.

According to an example embodiment, based on the TAS backoff regulation value being greater than or equal to a required power for communication of the electronic device, the processor may be configured to determine the TAS backoff regulation value as a power limit value for the time window. Based on the TAS backoff regulation value being less than the required power, the processor may be configured determine the required power as the power limit value for the time window.

According to an example embodiment, based on the TAS backoff regulation value being less than the required power, the processor may be configured to redetermine the TAS duty cycle value by dividing the TAS backoff regulation value by the required power. The processor may be configured to reset the TWT parameter based on the redetermined TAS duty cycle value. The processor may be configured to perform communication during the time window based on the reset TWT parameter and the required power.

According to an example embodiment, the processor may be configured to match the TWT duty cycle value to the redetermined TAS duty cycle value. The processor may be configured to reset the TWT parameter by combining a TWT interval and a TWT duration to satisfy the matched TWT duty cycle value.

According to an example embodiment, the processor may be configured to determine a combination of the TWT interval and the TWT duration satisfying the matched TWT duty cycle value based on a service type of a running service.

According to an example embodiment, based on the service type being a realtime service, the processor may be configured to determine a combination of a first TWT interval and a first TWT duration satisfying the matched TWT duty cycle value. Based on the service type being a non-realtime service, the processor may be configured to determine a combination of a second TWT interval and a second TWT duration satisfying the matched TWT duty cycle value. The first TWT interval may be shorter than the second TWT interval.

According to an example embodiment, the processor may be configured to control the wireless communication module to perform communication through a first mode in which communication is possible outside the TWT service period or a second mode in which communication is prohibited outside the TWT service period.

According to an example embodiment, the processor may be configured to calculate an energy budget allocated to the entire electronic device for the time window. The processor may be configured to distribute the energy budget to the wireless communication module based on the TWT duty cycle corresponding to the TWT parameter. The processor may be configured to determine the TAS backoff regulation value for the time window based on the energy budget distributed to the wireless communication module.

According to various example embodiments, an electronic device (e.g., the STA 301 of FIG. 3 and the electronic device 1401 of FIG. 14) may include: at least one wireless communication module comprising communication circuitry (e.g., the wireless communication module 710 of FIG. 7 and the wireless communication module 1492 of FIG. 14) configured to transmit and receive a wireless signal; at least one processor (e.g., the processor 720 of FIG. 7 and the processor 1420 of FIG. 14) operatively connected to the wireless communication module; and a memory (e.g., the memory 730 of FIG. 7 and the memory 1430 of FIG. 14) electrically connected to the processor and configured to store instructions executable by the processor. In response to the instructions being executed by the processor, the processor may be configured to determine whether there is a target wake time (TWT) parameter for a TWT service. The processor may be configured to control the wireless communication module to perform communication during a time window based on a time-averaged specific absorption rate (TAS) backoff regulation value for the time window and the TWT parameter. The TWT parameter may include at least one of start time information of a TWT service period, TWT duration information of the TWT service period, or TWT interval information of the TWT service period.

According to an example embodiment, the TAS backoff regulation value for the time window may be determined based on the TWT parameter.

According to an example embodiment, the processor may be configured to control the wireless communication module to transmit at least one of a TWT setup request frame, a TWT information frame, or a TWT teardown frame at a start point of the time window.

According to various example embodiments, an electronic device (e.g., the STA 301 of FIG. 3 and the electronic device 1401 of FIG. 14) may include: at least one wireless communication module comprising communication circuitry (e.g., the wireless communication module 710 of FIG. 7 and the wireless communication module 1492 of FIG. 14) configured to transmit and receive a wireless signal; at least one processor (e.g., the processor 720 of FIG. 7 and the processor 1420 of FIG. 14) operatively connected to the wireless communication module; and a memory (e.g., the memory 730 of FIG. 7 and the memory 1430 of FIG. 14) electrically connected to the processor and configured to store instructions executable by the processor. In response to the instructions being executed by the processor, the processor may be configured to determine whether there is a target wake time (TWT) parameter for a TWT service. The processor may be configured to set a transmission power to be used during a time window based on the TWT parameter. The processor may be configured to control the wireless communication module to perform communication during the time window with the transmission power based on the TWT parameter.

According to an example embodiment, the transmission power may be obtained based on a time-averaged specific absorption rate (TAS) backoff regulation value for the time window.

According to an example embodiment, the processor may be configured to control the wireless communication circuit to transmit at least one of a TWT setup request frame, a TWT information frame, or a TWT teardown frame at a start point of the time window.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device, comprising:
at least one wireless communication module, comprising communication circuitry, configured to transmit and receive a wireless signal;

at least one processor comprising processing circuitry and operatively connected to the at least one wireless communication module; and
a memory electrically connected to the at least one processor and configured to store instructions executable by the at least one processor,
wherein, in response to the instructions being executed individually and/or collectively by the at least one processor, the at least one processor individually and/or collectively is configured to:
perform a target wake time (TWT) negotiation with an external electronic device to communicate the external electronic device using a TWT protocol;
determine whether there is a TWT parameter according to the TWT negotiation;
determine a time-averaged specific absorption rate (TAS) backoff regulation value for a time window based on the TWT parameter; and
perform communication during the time window based on the TAS backoff regulation value and the TWT parameter.

2. The electronic device of claim 1, wherein the TWT parameter comprises at least one of:
start time information of a TWT service period, TWT duration information of the TWT service period, or TWT interval information of the TWT service period.

3. The electronic device of claim 1, wherein the at least one processor individually and/or collectively is configured to:
control the at least one wireless communication module to transmit at least one of a TWT setup request frame, a TWT information frame, or a TWT teardown frame at a start point of the time window.

4. The electronic device of claim 1, wherein the at least one processor individually and/or collectively is configured to:
calculate a temporary TAS backoff regulation value for the time window based on an energy budget allocated to an averaging window and an energy usage amount used during the averaging window,
wherein the averaging window comprises the time window.

5. The electronic device of claim 4, wherein the at least one processor individually and/or collectively is configured to:
based on there being the TWT parameter, determine a TAS duty cycle value based on a TWT duty cycle value corresponding to the TWT parameter; and
based on there not being the TWT parameter, determine the TAS duty cycle value as 1.

6. The electronic device of claim 5, wherein the TWT duty cycle value is obtained by dividing a TWT duration by a TWT interval, and
the TAS duty cycle value is obtained by dividing, by the time window, a period in the time window in which communication is performed.

7. The electronic device of claim 5, wherein the at least one processor individually and/or collectively is configured to:
determine the TAS backoff regulation value for the time window by dividing the temporary TAS backoff regulation value by the TAS duty cycle value.

8. The electronic device of claim 1, wherein the at least one processor individually and/or collectively is configured to:
based on the TAS backoff regulation value being greater than or equal to a required power for communication of the electronic device, determine the TAS backoff regulation value as a power limit value for the time window; and based on the TAS backoff regulation value being less than the required power, determine the required power as the power limit value for the time window.

9. The electronic device of claim 8, wherein the at least one processor individually and/or collectively is configured to:

based on the TAS backoff regulation value being less than the required power, redetermine a TAS duty cycle value by dividing the TAS backoff regulation value by the required power;

reset the TWT parameter based on the redetermined TAS duty cycle value; and control the at least one wireless communication module to perform communication during the time window based on the reset TWT parameter and the required power.

10. The electronic device of claim 9, wherein the at least one processor individually and/or collectively is configured to:

match a TWT duty cycle value to the redetermined TAS duty cycle value; and reset the TWT parameter by combining a TWT interval and a TWT duration to satisfy the matched TWT duty cycle value.

11. The electronic device of claim 10, wherein the at least one processor individually and/or collectively is configured to:

determine a combination of the TWT interval and the TWT duration satisfying the matched TWT duty cycle value based on a service type of a running service.

12. The electronic device of claim 11, wherein the at least one processor individually and/or collectively is configured to:

based on the service type being a realtime service, determine a combination of a first TWT interval and a first TWT duration satisfying the matched TWT duty cycle value; and based on the service type being a non-realtime service, determine a combination of a second TWT interval and a second TWT duration satisfying the matched TWT duty cycle value, wherein the first TWT interval is shorter than the second TWT interval.

13. The electronic device of claim 1, wherein the TWT parameter comprises a TWT service period and the at least one processor individually and/or collectively is configured to:

control the at least one wireless communication module to perform communication through a first mode in which communication is possible outside the TWT service period or a second mode in which communication is prohibited outside the TWT service period.

14. The electronic device of claim 1, wherein the at least one processor is configured to:

calculate an energy budget allocated to an entirety of the electronic device for the time window;

distribute the energy budget to the at least one wireless communication module based on a TWT duty cycle corresponding to the TWT parameter; and determine the TAS backoff regulation value for the time window based on the energy budget distributed to the at least one wireless communication module.

15. An electronic device, comprising:

at least one wireless communication module comprising communication circuitry configured to transmit and receive a wireless signal;

at least one processor comprising processing circuitry and operatively connected to the at least one wireless communication module; and a memory electrically connected to the at least one processor and configured to store instructions executable by the at least one processor, wherein, in response to the instructions being executed by the at least one processor, the at least one processor individually and/or collectively is configured to:

perform a target wake time (TWT) negotiation with an external electronic device to communicate the external electronic device using a TWT protocol;

determine whether there is a TWT parameter according to the TWT negotiation; and control the at least one wireless communication module to perform communication during a time window, based on a time-averaged specific absorption rate (TAS) backoff regulation value for the time window and the TWT parameter, wherein the TWT parameter comprises at least one of:

start time information of a TWT service period, TWT duration information of the TWT service period, or TWT interval information of the TWT service period.

16. The electronic device of claim 15, wherein the TAS backoff regulation value for the time window is determined based on the TWT parameter.

17. The electronic device of claim 15, wherein the at least one processor individually and/or collectively is configured to:

control the at least one wireless communication module to transmit at least one of a TWT setup request frame, a TWT information frame, or a TWT teardown frame at a start point of the time window.

18. An electronic device, comprising:

at least one wireless communication module comprising communication circuitry configured to transmit and receive a wireless signal;

at least one processor composing processing circuitry operatively connected to the at least one wireless communication module; and a memory electrically connected to the at least one processor and configured to store instructions executable by the at least one processor, wherein, in response to the instructions being executed by the at least one processor, the at least one processor individually and/or collectively is configured to:

perform a target wake time (TWT) negotiation with an external electronic device to communicate the external electronic device using a TWT protocol;

determine whether there is a TWT parameter according to the TWT negotiation;

set transmission power to be used during a time window, based on the TWT parameter; and control the at least one wireless communication module to perform communication by the transmission power during the time window, based on the TWT parameter.

19. The electronic device of claim 18, wherein the transmission power is obtained based on a time-averaged specific absorption rate (TAS) backoff regulation value for the time window.

20. The electronic device of claim 18, wherein the at least one processor individually and/or collectively is configured to:

control the at least one wireless communication module to transmit at least one of a TWT setup request frame, a TWT information frame, or a TWT teardown frame at a start point of the time window.

*     *     *     *     *